(12) United States Patent
Brown, II et al.

(10) Patent No.: US 10,736,445 B1
(45) Date of Patent: Aug. 11, 2020

(54) BEVERAGE CONTAINER SYSTEM AND COMPONENTS

(71) Applicant: Benjamin Alexander Brown, II, Vero Beach, FL (US)

(72) Inventors: Benjamin Alexander Brown, II, Vero Beach, FL (US); Daniel Chambers, Houston, TX (US)

( * ) Notice: Subject to any disclaimer, the term of this patent is extended or adjusted under 35 U.S.C. 154(b) by 0 days.

(21) Appl. No.: 16/780,551

(22) Filed: Feb. 3, 2020

Related U.S. Application Data

(63) Continuation-in-part of application No. 16/234,019, filed on Dec. 27, 2018, now Pat. No. 10,549,902.

(51) Int. Cl.
| | |
|---|---|
| *A47G 19/22* | (2006.01) |
| *B65D 85/72* | (2006.01) |
| *A47J 41/02* | (2006.01) |
| *B65D 81/38* | (2006.01) |
| *B65D 8/00* | (2006.01) |

(52) U.S. Cl.
CPC ........ *A47G 19/2255* (2013.01); *A47J 41/026* (2013.01); *A47J 41/028* (2013.01); *B65D 15/10* (2013.01); *B65D 81/3841* (2013.01); *B65D 85/72* (2013.01); *A47J 2201/00* (2013.01)

(58) Field of Classification Search
CPC .. B65D 1/40; B65D 81/3874; B65D 81/3869; B65D 81/3865; B65D 81/38; B65D 81/3818; B65D 43/022; B65D 43/0214; B65D 43/0202; B65D 53/02; A47G 19/2255; A47G 19/2288; A47G 19/2272; A47G 19/2205
USPC ... 220/592.17, 592.16, 592.27, 592.2, 62.18, 220/62.17, 62.12, 62.11, 711, 625, 23.91, 220/23.89, 23.87, 739, 737
See application file for complete search history.

(56) References Cited

U.S. PATENT DOCUMENTS 3,365,092 A * 1/1968 Blessing ............. A47J 41/0055
220/23.88

\* cited by examiner

*Primary Examiner* — Robert J Hicks
(74) *Attorney, Agent, or Firm* — Akerman LLP

(57) ABSTRACT

A beverage container system may include a vessel having an interior volume for containing a beverage and shell having an interior volume for removably coupling vessel therein. The shell may include an inner wall, an outer sidewall, and a sealed volume between the inner wall and the outer wall. The sealed volume may be at a vacuum pressure. The vessel may be constructed from glass while the shell may be constructed from a durable material such as stainless steel.

20 Claims, 27 Drawing Sheets

# BEVERAGE CONTAINER SYSTEM AND COMPONENTS

CROSS-REFERENCE TO RELATED APPLICATIONS

The application is a continuation-in-part of U.S. patent application Ser. No. 16/234,019, filed Dec. 27, 2018, the contents of which is hereby incorporated herein by reference.

TECHNOLOGY FIELD

The present description is directed to beverage containers. More specifically, the present description is directed to modular beverage containers and modular insulated beverage containers.

BACKGROUND

Beverage containers include vessels for holding and pouring beverages such as cups, glasses, tumblers, mugs, and goblets. Beverage containers may be specifically designed for particular activities such as sport water bottles or squirt bottles. Such containers may include a tightly sealable cap, squirt nozzle, or straw. Some beverage containers may be specifically designed for particular beverages such as wine glasses and coffee mugs. Coffee mugs are also an example of an insulated beverage container designed to limit heat transfer to maintain a temperature of a beverage. Other insulated beverage containers may include insulation between interior and exterior surfaces. One such example is a tumbler having a double wall vacuum seal. These tumblers are typically constructed from stainless steel due to its durability and ability to limit heat transfer in the double wall configuration.

SUMMARY

In one aspect a modular beverage container system includes a vessel and a shell. The vessel may include a sidewall having an upper rim and defining an interior volume for holding a beverage. The shell may include an inner wall, an outer wall, an upper rim, and a sealed volume between the inner wall and the outer wall. The sealed volume may be at a vacuum pressure. The inner wall and upper rim may define an interior volume configured to receive the vessel and removably couple thereto.

In one example, a fitting is positioned within the interior volume of the shell. The fitting may provide a reduced dimension along a perimeter of the interior volume of the shell with respect to a corresponding dimension of the vessel to provide a press fit that removably couples the vessel within the interior volume of the shell. In a further example, the fitting includes one or more inwardly directed projections that engage an outer surface of the sidewall of the vessel when received within the interior volume of the shell. The one or more inwardly directed projections may include one or more sets of wedge-shaped projections. In one configuration, at least one gap extends vertically between the one or more inwardly directed projections. In one embodiment, the fitting includes a flange that positions between the upper rim of the shell and a lip of the vessel when the vessel is removably coupled to the shell within the interior volume of the shell.

In an above or another example, the system further includes a fitting receptacle positioned along the inner wall of the shell for securely attaching the fittings within the interior volume of the shell. The fitting receptacle may include one or more grooves that interface with one or more corresponding projections that extend outwardly of an outer perimeter of the fitting. In one configuration, the fitting receptacle comprises one or more inwardly directed projections that interface with one or more corresponding grooves positioned along an outer perimeter of the at least one fitting.

In an above or another example, when the vessel and shell are removably coupled, an outer surface of the sidewall of the vessel positions approximately flush with an outer surface of the outer wall of the shell. In an above or another example, the upper rim of the vessel includes a lip, and when the vessel and shell are removably coupled, the lip of the vessel positions over an upper surface of the upper rim of the shell. In an above or another example, the upper rim of the vessel includes an outer sidewall that extends around the upper rim between an upper surface of the upper rim and the lip of the vessel, and when the vessel and shell are removably coupled, the outer sidewall of the vessel positions approximately flush with an outer surface of the outer wall of the shell. In one example, the vessel comprises a glass and the shell comprises stainless steel.

In an above or another example, the system includes a lid configured to removably couple over the interior volume of the vessel. The lid may include a fitting configured to press fit against an inner surface of the sidewall of the vessel to removably couple over the interior volume of the vessel. When the lid is removably coupled over the interior volume of the vessel, an upper surface of the upper rim of the lid may position approximately flush with or below an upper surface of the upper rim of the vessel.

In another aspect, a method of assembling a modular beverage container includes inserting a vessel within an interior volume of a shell, and removably coupling the vessel within the interior volume of the shell. A fitting may be positioned within the interior volume of the shell and define a dimension therein that is less than a corresponding dimension of the vessel to provide a press fit. The press fit may include positioning the vessel within the interior volume of the shell such that the fitting engages the corresponding dimension of the vessel. The shell may include an outer wall and inner wall, the inner wall defining the interior volume. A sealed volume at a vacuum pressure may be provided between the outer wall and inner wall of the vessel.

In one example, the vessel has an upper rim including an outer sidewall, and when the vessel and shell are removably coupled, the outer sidewall is positioned above an upper rim of the shell and extends outwardly of a portion of the interior volume of the shell defined by the upper rim of the shell. The upper rim of the vessel may include a lip, and when the vessel and shell are removably coupled, the lip may position over an upper surface of the upper rim of the shell and the outer sidewall positions approximately flush with an outer surface of the outer wall of the shell.

In yet another aspect a modular beverage container system includes a vessel, a shell, a fitting, and a lid. The vessel may include glass and have a sidewall having an upper rim and defining an interior volume for holding a beverage. The shell may include an inner wall, an outer wall, an upper rim, and a sealed volume between the inner wall and the outer wall. The sealed volume may be at a vacuum pressure. The inner wall and upper rim may define an interior volume configured to receive the vessel and removably couple thereto. The fitting may be positioned within the interior volume of the shell. The fitting may provide a reduced dimension along a perimeter of the interior volume of the shell with respect to a corresponding dimension of the vessel to provide a press fit that removably couples the vessel within the interior volume of the shell. A fitting receptacle may be positioned along the inner wall of the shell for securely attaching the fittings within the interior volume of the shell. The fitting receptacle may include one or more grooves and/or projections that interface with corresponding projections and/or grooves of the fitting. The lid may be configured to press fit against an inner surface of the sidewall of the vessel to removably couple over the interior volume of the vessel.

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

DESCRIPTION

Figure 1:
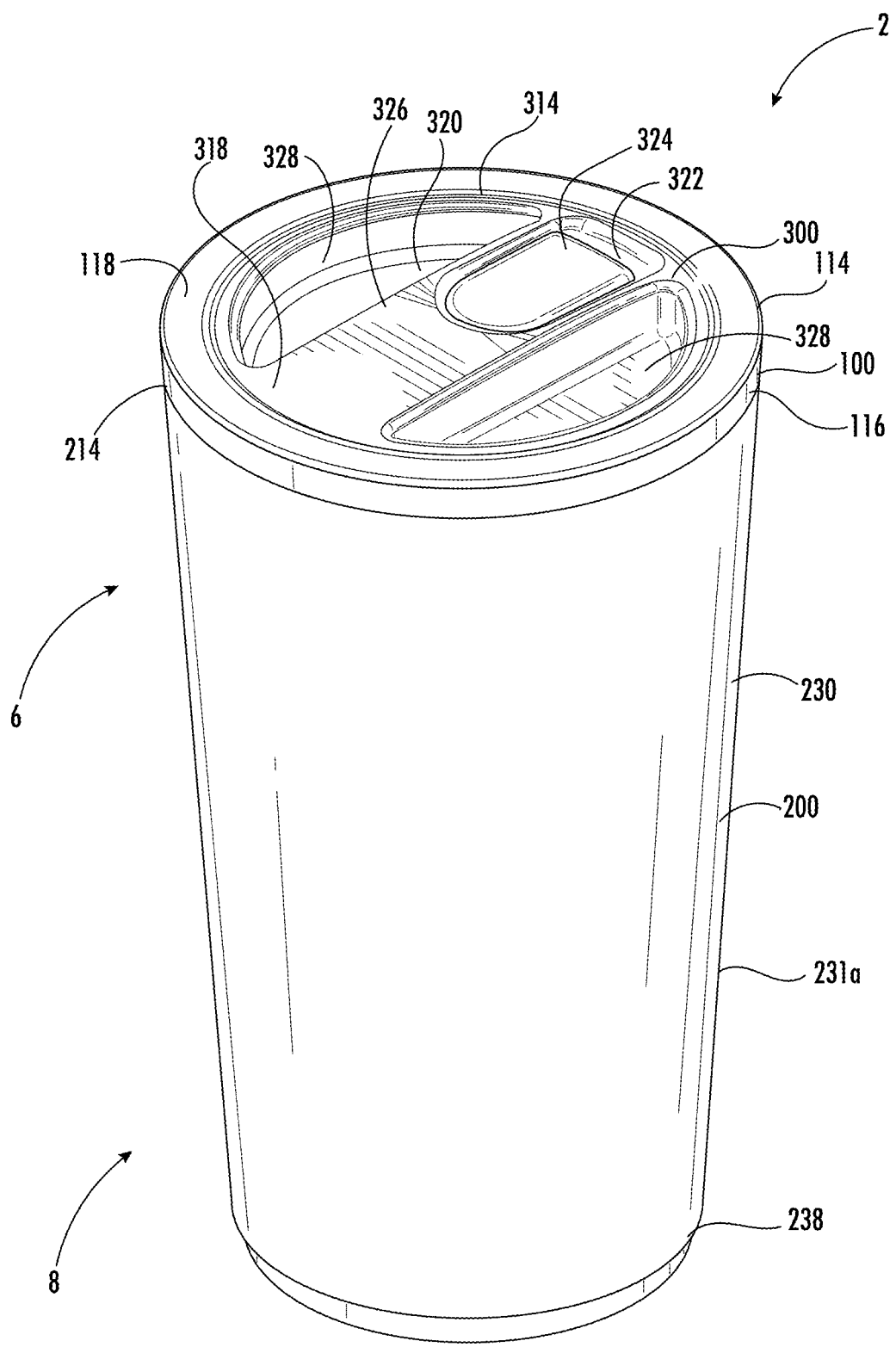
FIG. 1 is a perspective view of an assembled modular beverage container system according to various embodiments described herein.

The present disclosure describes improved beverage container systems and components thereof that address various practical limitations that exist with current beverage containers. Some embodiments may further include insulated beverage container systems and components thereof that address limitations that exist with current insulated beverage containers. These or further embodiments may include modular beverage container systems and components thereof.

Stainless steel, while durable, cost-effective, and capable of providing a level of insulation for many applications, is not an ideal material to drink from in terms of flavor. For example, many popular beverages such as coffee, tea, beer, wine, liquor, and juice are acidic; however, stainless steel reacts with acids, which may corrode the passive layer of a stainless steel vessel, imparting a metallic taste.

Unlike metals and plastics, which may leach chemicals, glass does not chemically react with potable liquids in a significant way. Accordingly, glass does not notably interfere with taste of a beverage. One drawback of glass, however, is that glass typically has inferior durability and is susceptible to fracture.

According to various embodiments, the teachings of the present disclosure may be used to incorporate a vessel with a durable outer shell. In some embodiments, the vessel may comprise a glass to thereby incorporate the superior drinking surface of glass within a protective shell. The shell may be constructed of a rigid material such as a metal or alloy, e.g., steel, to protect the vessel. Thus, the shell design may be used to mitigate durability disadvantages associated with the construction material of the vessel. In one example, the vessel may comprise a double wall vacuum construction. In another example, the vessel may comprise a single wall construction and the shell may comprise a double wall vacuum construction. In any of the above or another example, the vessel may comprise a modular liner configured to be received within the shell. For example, the shell and vessel may form a modular beverage container system wherein the shell and vessel may be removably coupled. For instance, the vessel may be securely received within the shell and thereafter be suitably removable therefrom during normal operation of the system without damaging the shell or vessel. In addition to improving drinking characteristics, the modular design provides a user an ability to remove the vessel and place it in a dishwasher, microwave, or freezer, which is a limitation of existing stainless steel tumblers. It will be appreciated that beverage container systems and components described herein may include materials other than glass and stainless steel. For example, various embodiments may include a vessel or shell comprising one or more of a ceramic, non-metallic ceramic, glass-ceramic, polymer, plastic, silicone, thermoplastic, polymer glass such as a polycarbonate, acrylic, or polyethylene terephthalate, metal, metallic, such as steel or stainless steel, rock, artificial stone, or combination or composite thereof. In one example, the shell comprises wood.

FIGS. 1-28 illustrate various exemplary embodiments and features of a modular beverage container system 2, 3 according to various wherein like numbers refer to like features. The modular beverage container system 2, 3 shown in the drawings includes a modular configuration; however, it is to be understood that some embodiments may include one or more of such modular components combined as a unitary component or may exclude one or more such components.

FIG. 1 illustrates an embodiment of the modular beverage container system 2 in an assembled configuration. The modular beverage container system 2 includes a vessel 100 and a shell 200. The vessel 100 defines an interior volume 110 (see, e.g., FIG. 8) configured to hold a liquid. The shell 200 may also define an interior volume 210 (see, e.g., FIG. 4) dimensioned to receive the vessel 100 therein. The vessel 100 includes an upper rim 114 defining an opening 115 (see, e.g., FIG. 2) into the interior volume 110 of the vessel 100. The shell 200 similarly includes an upper rim 214 defining an opening 215 into the interior volume 210 of the shell 200.

In the embodiment shown in FIG. 1, the upper rim 114 positions above an upper rim 214 of the shell 200, exposing a sidewall 116 of the upper rim 114 along an upper end 6 of the modular beverage container system 2 in an assembled configuration. In some embodiments, the upper rim 114 of the vessel 100 may extend level with or below the upper rim 214 of the shell 200.

In various embodiments, the modular beverage container system 2 includes a lid 300. The lid 300 may be configured to be modular with respect to the vessel 100 and shell 200 and to be removably coupled over the interior volume 110 of the vessel 100. In the embodiment shown in FIG. 1, the lid 300 positions within the upper rim 114 of the vessel 100, relatively flush with an upper surface 118 thereof. As described in more detail below, some embodiments may include other lid 300 configurations, such as those wherein the lid 300 extends over the upper rim 114 of the vessel 100 and/or the upper rim 214 of the shell 200, or upper surfaces 118, 218 thereof, when the modular beverage container system 2 is in an assembled configuration. In some examples, the lid 300 may position above or below the upper rim 114 of the vessel 100.

In various embodiments, the lid 300 may include a partition wall 320 defining an opening 322 through which liquid may flow into or out of the interior volume 110 of the vessel 100. The lid 300 may also include a cap 324 that is positionable over or through the opening 322 to prevent passage of liquid through the opening 322. In some embodiments, however, the lid 300 does not include a cap 324.

In some embodiments, the lid 300 may also includes a grip 326. The grip 326 may be dimensioned to be gripped by a user to allow the user to manipulate the lid 300. The grip 326 may include one or more slots 328 into which a user may position one or more fingers to push, pull, or rotate the lid 300. For example, a user may position fingers in slots 328 and therein compress the lid 300 between the slots 328 to obtain leverage to lift the lid 300. In various configurations, the lid 300 may include a grip 326 including indentations, projections, or other surface features onto which fingers of a user may engage to assist in manipulation of the lid 300. In some embodiments, the grip 326 may include a coating or outer skin, e.g., a silicone or an elastomer. The coating or outer skin may assist a user in gripping the lid 300, e.g., the coating or outer skin may be textured or ergonomically dimensioned to aid in grip.

The modular beverage container system 2 depicted in FIG. 1 has a generally cylindrical profile shape that tapers from the upper end 6 toward a lower end 8. The modular beverage container system 2 also includes an annular horizontal cross-section shape having an increasing diameter from the lower end 8 to the upper end 6. In other embodiments, the modular beverage container system 2, e.g., vessel 100, shell 200, lid 300, or a combination thereof may include other profiles and/or cross-section shapes. For example, the modular beverage container system 2 may have a profile shape including straight or curved sides. Curves, for example, may curve outward from the lower end 8 toward the upper end 6. In some examples, the profile shape may taper at one or more points from the upper end 6 to the lower end 8. In various embodiments, the profile shape may include multiple tapered regions that taper at the same or different rates or degrees. In another example, the modular beverage container system 2 may have a profile shape that includes straight sides without tapering. Various embodiments of the modular beverage container system 2 may also include cross-section shapes such as annular or multisided geometric or non-geometric shapes.

Figure 2:
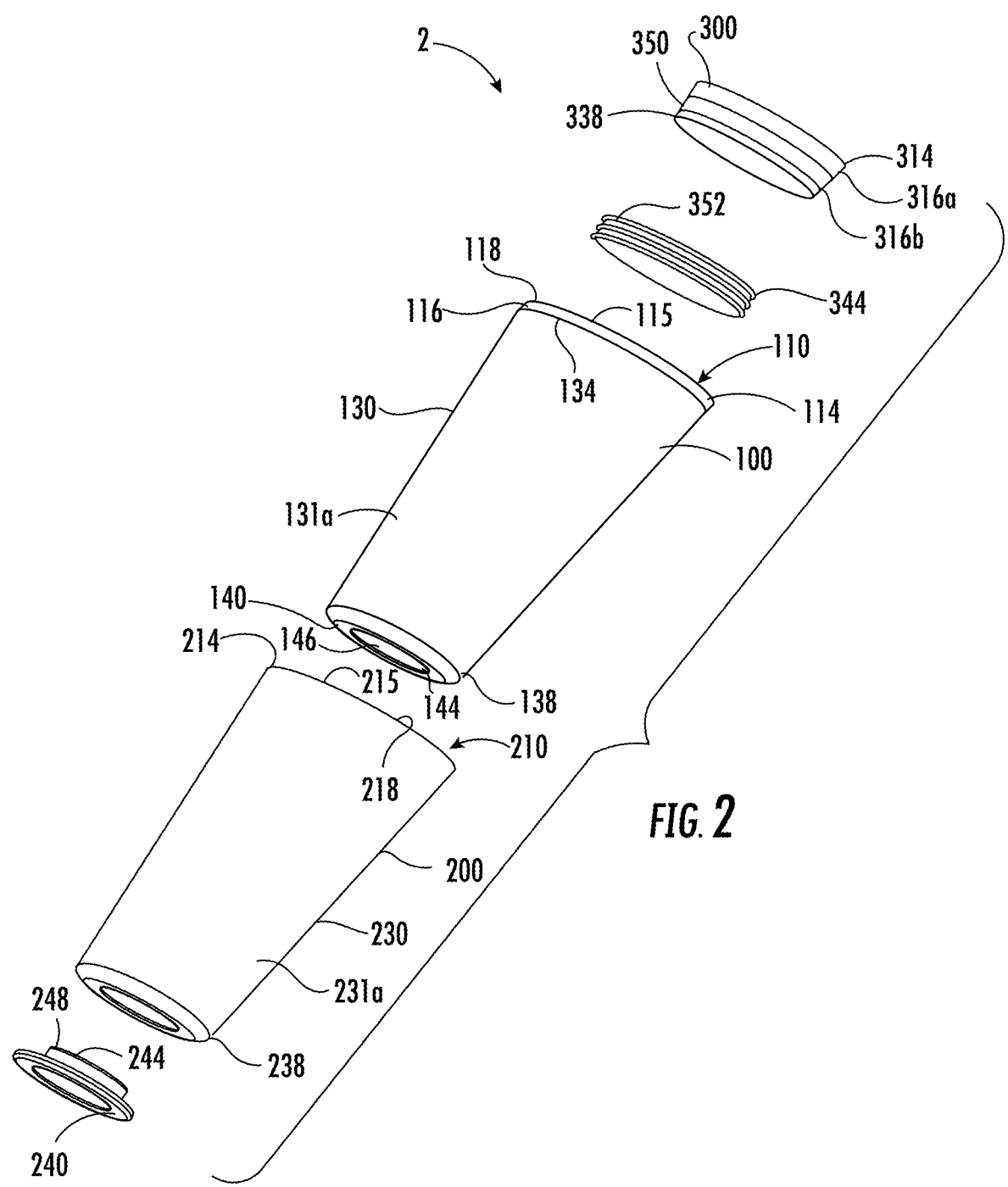
FIG. 2 is an exploded view of a modular beverage container system according to various embodiments described herein.
Figure 3:
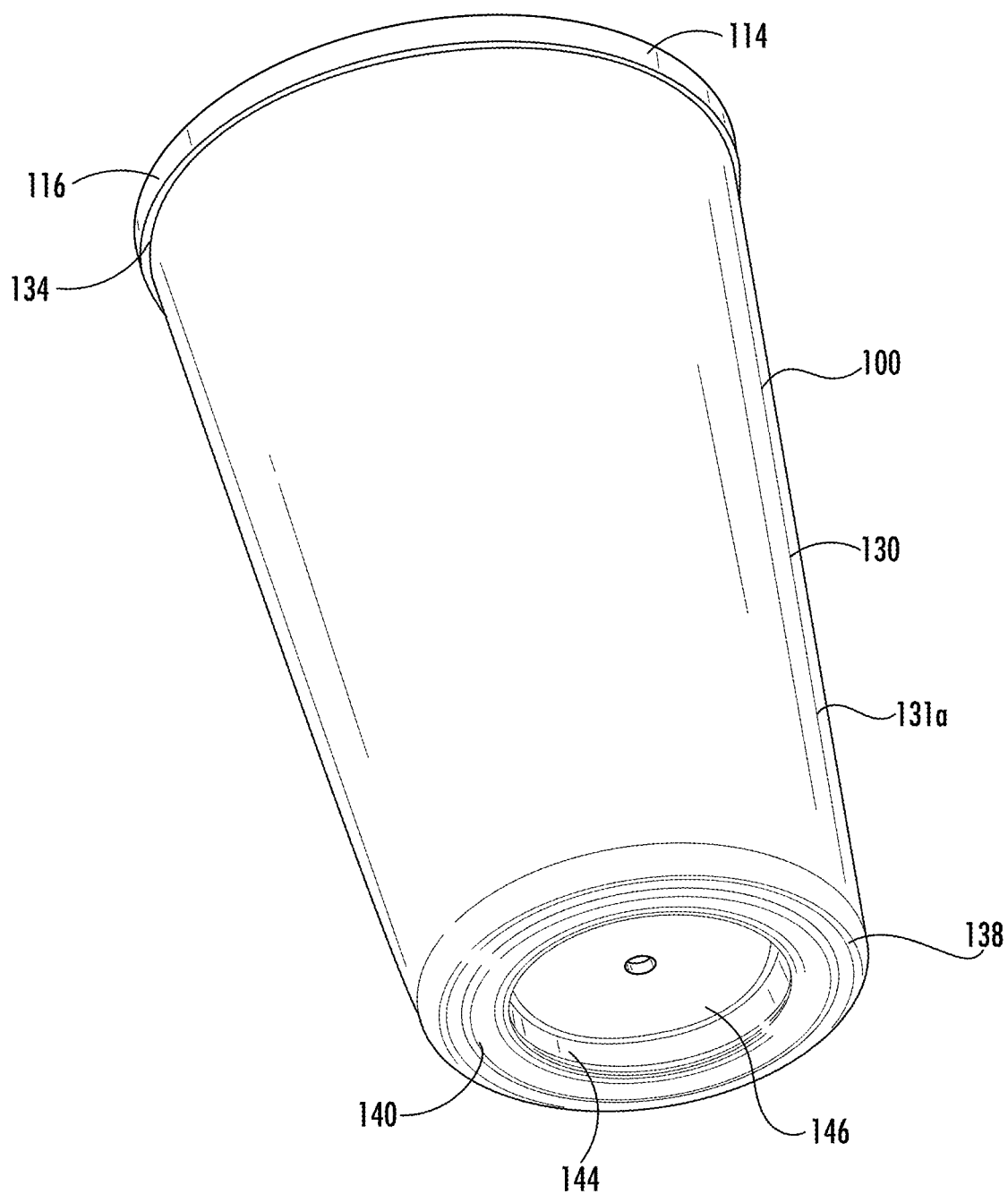
FIG. 3 is a perspective view of a vessel of a modular beverage container system according to various embodiments described herein.
Figure 4:
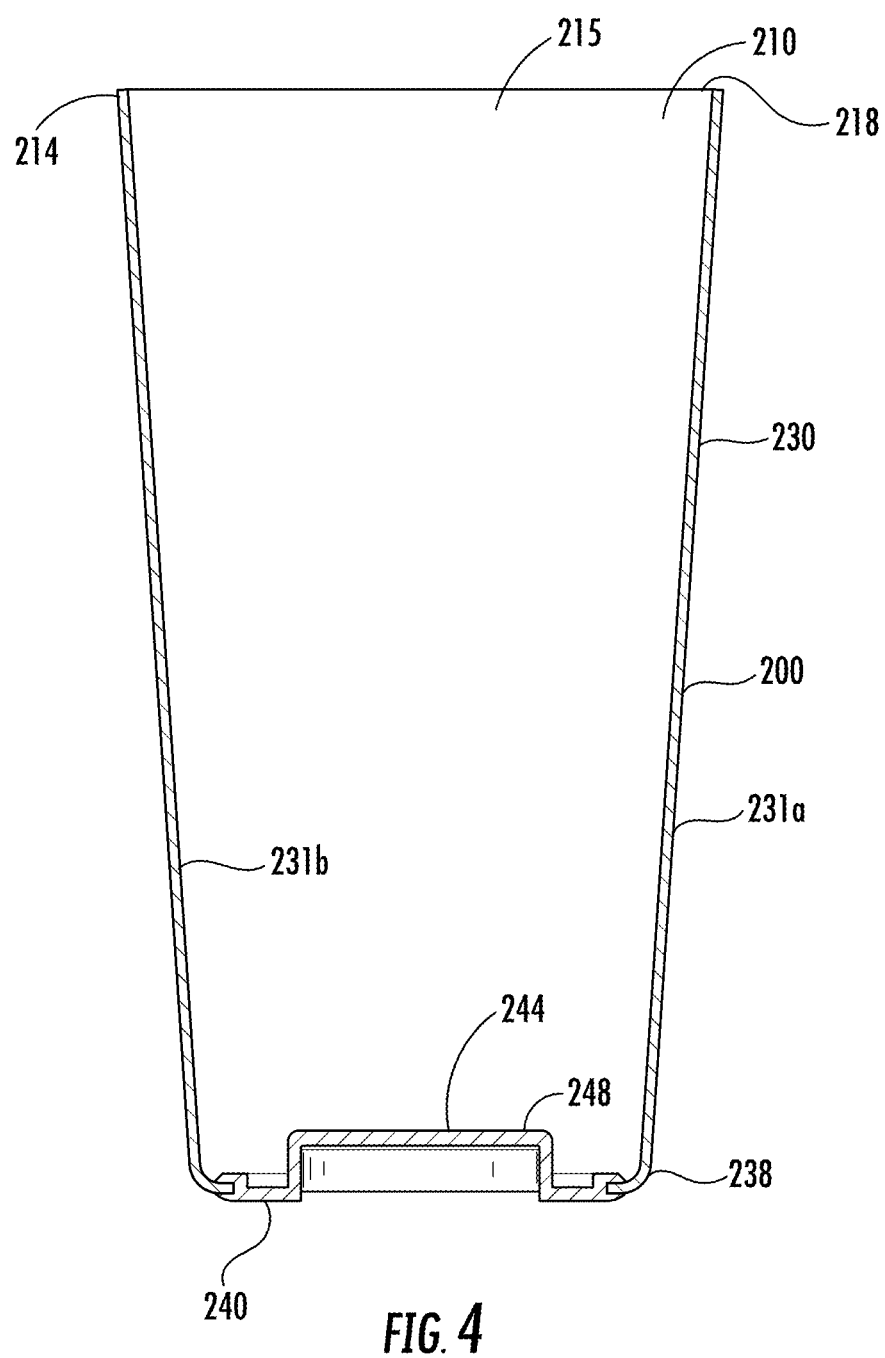
FIG. 4 is a cross-section view of a shell of a modular beverage container system according to various embodiments described herein.
Figure 5:
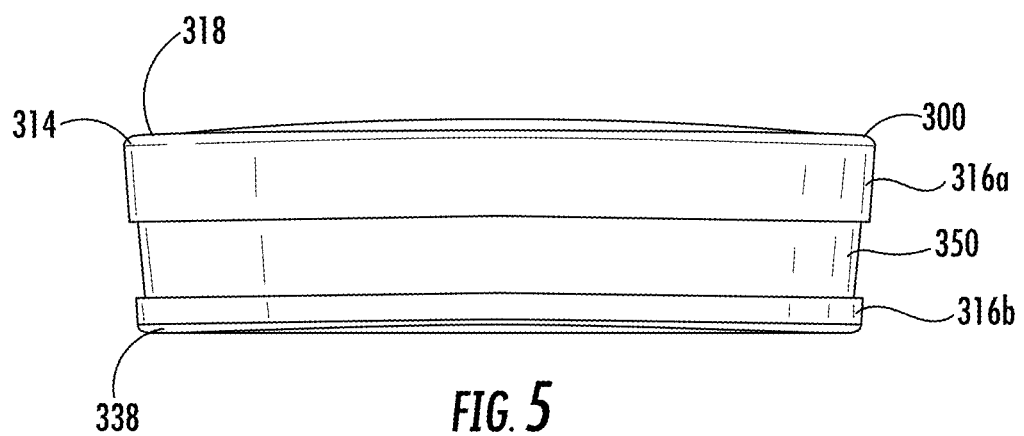
FIG. 5 is an orthogonal view of a lid for a modular beverage container system according to various embodiments described herein.
Figure 6:
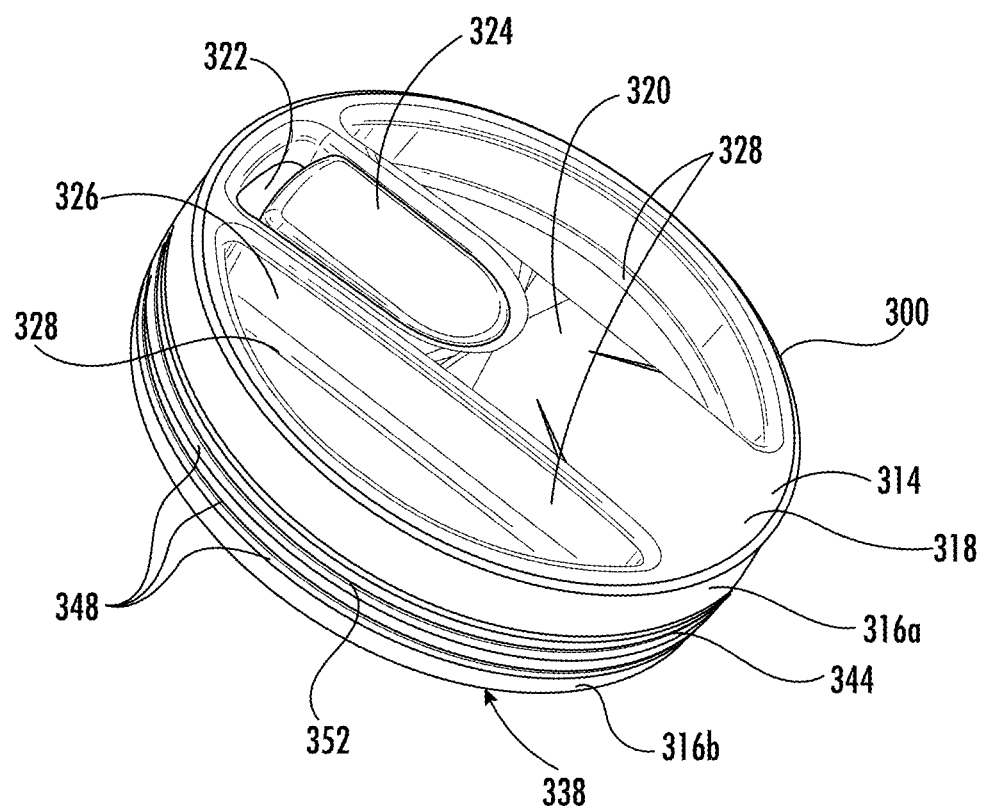
FIG. 6 is a perspective view of an upper end of a lid according to various embodiments described herein.

FIG. 2 depicts an exploded view of the assembled modular beverage container system 2 shown in FIG. 1 and illustrates modularity features of the vessel 100 and shell 200 according to various embodiments. FIG. 3 illustrates an isolated view in perspective of the vessel 100, while FIG. 4 illustrates a cross-section view of the shell 200. FIG. 5 illustrates a side view of the lid 300, and FIG. 6 illustrates a perspective view of the lid 300.

With specific reference to FIGS. 2 & 3, the vessel 100 may include one or more walls 130 extending between the upper rim 114 and a lower rim 138. The one or more walls 130 includes an outer sidewall 131a and an inner sidewall 131b. The inner sidewall 131b may at least partially define the interior volume 110 of the vessel 100. The lower rim 138 may extend to a base 140. The upper rim 114 may include a lip 134 that projects outwardly beyond an adjacent lower portion of the wall 130. For example, the upper rim 114 may comprise a flange that extends outward beyond the wall 130. The upper rim 114 may also include a perimeter edge, referred to herein as upper sidewall 116. As introduced above with respect to FIG. 1, the modular beverage container system 2 may be configured such that the upper sidewall 116 is exposed when the modular beverage container system 2 is in an assembled configuration. However, in other embodiments, the upper sidewall 116 may not be exposed when the modular beverage container system 2 is in an assembled configuration.

The vessel 100 may include single or multiwall configurations, such as a double wall configuration, e.g., as described below with respect to FIGS. 7-9. A multiwall configuration may further include insulation between walls. For example, vacuum insulation comprising a vacuum pressure maintained between two or more of the walls may be used to insulate the interior volume. Other insulating materials could also be used between walls such as plastics, foam, cellulose, glass, ceramics, or stone, for example.

In various embodiments, the vessel 100 may comprise glass, such as a silicate glass. In one embodiment, the vessel 100 comprises a borosilicate glass. While the properties of glass may offer a preferred balance of characteristics, particularly when protected by a durable, rigid shell 200, in some embodiments, the vessel 100 may be constructed from other materials, either together with or instead of glass. For example, in one embodiment, the vessel 100 comprises one or more of a ceramic, non-metallic ceramic, glass-ceramic, polymer, plastic, silicone, thermoplastic, polymer glass such as a polycarbonate, acrylic, or polyethylene terephthalate, metal, metallic, such as steel or stainless steel, rock, artificial stone, or combination or composite thereof. The beverage container systems and components are typically sized for personal use or to hold a common volume of liquid for a personal beverage container such as 12 oz., 20 oz., 32 oz., or 40 oz., for example. However, the vessel 100 and shell 200 are not limited to such sizes.

In various embodiments, the shell 200 and/or vessel 100 may comprise one or more fittings 144, 244 configured to removably couple the shell 200 and vessel 100. In the embodiment illustrated in FIGS. 2 & 3, the vessel 100 includes a fitting 144 comprising a hole 146 defined in the base 140. The base 140 and/or fitting 144 may comprise the same material as the wall 130 or may be made of a different material. For example, the base 140 may comprise the same material as the wall 130 and lower rim 138 and be continuous therewith. In another example, the base 140 may be attached to the lower rim 138 by adhesive or may be over molded with a portion of the lower rim 138 and/or a sub-base extending across the cross-section defined by the lower rim 138.

With further reference to FIG. 4, the shell 200 may include one or more walls 230 extending between the upper rim 214 and a lower rim 238. The wall 230 may include an outer sidewall 231a and an inner sidewall 231b. The inner sidewall 231b may define an interior volume 210 dimensioned to removably receive the vessel 100. The outer sidewall 231a may form an exterior surface of the shell 200, which may be used by a user to grip or hold the shell 200 or modular beverage container system 2. A base 240 may form a bottom end of the shell 200 and extend between the lower rim 238.

The shell 200 preferably comprises a durable material, which may also be rigid, suitable to protect the vessel 100 when received within the shell 200. In one example, the shell 200 is constructed from stainless steel. In various embodiments, other materials may be used such as one or more of a ceramic, non-metallic ceramic, glass-ceramic, polymer, plastic, silicone, thermoplastic, polymer glass such as a polycarbonate, acrylic, or polyethylene terephthalate, metal, metallic, such as steel or stainless steel, rock, artificial stone, or combination or composite thereof. In some embodiments, the base 240 may include a coating or outer skin along outer sidewall 231a. The coating or outer skin may include a silicone or an elastomer for example. The coating or outer skin may assist a user in gripping the shell 200, e.g., the coating or outer skin may be textured or ergonomically dimensioned to aid in grip. In one example, the shell 200 includes a handle extending from wall 230.

The base 240 includes a fitting 244 configured to removably couple the vessel 100. The fitting 244 illustrated includes a projection 248 extending from the base 240. The projection 248 may have dimensions corresponding to the dimensions of hole 146 and may include a slightly larger dimension to provide a tight or interference fit with the hole 146.

The base 240 and/or fitting 244 may comprise the same material as the wall 230 or may be constructed from a different material. For example, in one embodiment, the base 240 may comprise the same material as the wall 230 and lower rim 238 and be continuous therewith. In another example, the base 240 may be attached to the lower rim 238 by adhesive or may be over molded with a portion of the lower rim 238 and/or a sub-base extending across the cross-section defined by the lower rim 238. In the example shown in FIGS. 2 & 4, the base 240 of the shell 200 comprises an elastomeric material comprising a silicone base 240 that is over molded with respect to the lower rim 238.

The interior volume 210 may be sealed along the wall 230 and base 240. In some embodiments, the interior volume 210 may include one or more openings along the wall 230 or base 240. For example, an opening may be provided through the wall 230 or base 240 to allow atmosphere to move into or out of the interior volume 240 during assembly/coupling or disassembly/uncoupling. In some embodiments, an opening may be selectively opened and closed, e.g., via removal of a plug or opening of a valve.

In various embodiment wherein the modular beverage container system 2 comprises a fitting configured for press fitment, at least one of a hole, such as hole 146, or a projection, such as projection 248, includes a resiliently compressible and/or elastomeric material that may be resiliently compressed or stretched to thereafter provide a friction fit with respect to the other. Elastomeric may refer to flexible materials that may be bendable to obtaining different confirmations. Typically, such elastomeric materials will return to a previous conformation when a force causing the deformation and/or conformational bend is removed.

In some embodiments, hole 146, projection 248, or both comprises tapered sides or cross-sections. For example, the hole 146 may include an opening profile that tapers inwardly, into the hole 146, and/or the projection 248 may include a profile that tapers outwardly. A tapered configuration may ease initial lining up and pressing of the projection 248 into the hole 146 when the initial cross-section of the hole 146 is greater than the initial cross-section of the projection 248 with respect to an insertion sequence for press fitting the two. In other embodiments, the sides of the hole 146, projection 248, or both are not tapered.

With continued reference to FIGS. 2-4, the vessel 100 and shell 200 may be removably coupled by inserting the vessel 100 into the interior volume 210 of the shell 200 and pressing the projection 248 into hole 146. The corresponding fittings 144, 244 and walls 130, 230 may be dimensioned such that an upper surface 218 of the upper rim 214 of the shell 200 engages the lip 134 of the upper rim 114 of the vessel 100 when a suitable press fit has been achieved. As described above and elsewhere herein, in some examples, the upper rim 114 of the vessel 100 does not include a lip 134 and the upper rim 114 may position above, approximately flush with, or below an upper surface 218 of the upper rim 214 of the shell 200 in an assembled configuration. When the upper rim 114 of the vessel 100 positions above the upper rim 214 of the shell 200, the upper rim 114 of the vessel 100 may provide a region upon which a user may grip the vessel 100 during coupling and uncoupling of the vessel 100 and the shell 200. In some such embodiments, the upper rim 114, e.g., upper surface 118 and/or sidewall 116, may be contoured to provide better grip. In this or another example, the upper rim 114 of the vessel 100 may extend outwardly beyond the upper rim 214 of the shell 200 when the vessel 100 and shell 200 are removably coupled in an assembled configuration.

With particular reference to FIGS. 2, 5 & 6, the lid 300 may include an upper rim 314 and a lower rim 338. One or more sidewalls 316a, 316b may extend between the upper rim 314 and lower rim 338. As introduced above, assembling the modular beverage container system 2 may include removably coupling the lid 300 over the interior volume 110 of the vessel 100. Accordingly, various embodiments of the lid 300 may include a fitting 344 configured to assist in removably coupling the lid 300 over the interior volume 110 of the vessel 100. For example, the lid 300 may include a fitting 344 comprising an outer perimeter having a cross-section slightly larger than a cross-section of an interior perimeter of the vessel 100. The outer perimeter may comprise a resiliently compressible material configured to assist in a friction fit to thereby press fit the fitting 344 within the smaller cross-section of an interior perimeter of the interior volume 110 defined by the inner sidewall 131b of the vessel 100. In some embodiments, the interior perimeter of the vessel 100 along the inner sidewall 131b, the outer perimeter of the fitting 344, or both may include a cross-section that tapers such that the cross-section along a lower portion of the fitting 344 is smaller than a cross-section along an upper portion of the interior perimeter of the interior volume defined by the inner sidewall 131b to assist in guiding and thereby compressing the fitting 344 against the sidewall 130 within a smaller lower portion of the interior perimeter of the interior volume defined by the inner sidewall 131b.

In the embodiment illustrated in FIGS. 2 & 6, the fitting 344 comprises one or more projections 348 defining an outer perimeter of the lid 300. The projections 348 are configured to compress against the interior perimeter of the inner sidewall 131b when inserted therebetween. The projections 348 may comprise a resiliently compressible elastomeric material such as silicone configured to provide a friction fit when compressed against the inner sidewall 131b. The projections 348 may be integral or modular with respect to the lid 300. In the illustrated embodiment, and as most clearly depicted in FIG. 5, the lid 300 may define a perimeter groove 350 that opens outwardly and extends around the lid 300 between an upper sidewall 316a and a lower sidewall 316b. As further shown in FIG. 2, the fitting 344 may also include a seal gasket 352, which is modular in this embodiment (see also FIG. 13). The seal gasket 352 includes three annular projections 348 and is dimensioned to be securely positionable within the groove 350 to extend along the outer perimeter of the lid 300 (see FIG. 6) and therefrom engage the inner sidewall 131b along the interior perimeter of the interior volume 110 to provide a seal therebetween when the fitting 344 is compressed against the sidewall 131b of wall 130. The outer perimeter of the lid 300 tapers from the upper sidewall 316a toward the lower sidewall 316b. In one embodiment, the lid 300 does not taper.

As introduced above, the vessel 100 may have a single or multiwall configuration. FIG. 7 illustrates a cross-section of an example of the vessel 100 wherein the vessel 100 has a multiwall configuration. In particular, the wall 130 includes an inner or first wall 130a that defines at least a portion of the interior volume 110 of the vessel 100 and an outer or second wall 130b that may define a portion of the outer profile of the vessel 100 wherein the first wall 130a is positioned interiorly of the second wall 130b. The first wall 130a may extend between the upper rim 114 and a vessel floor 156. The second wall 130b may extend between the upper rim 114 and the lower rim 138. The upper rim 114 of the vessel 100 may comprise a solid material, such as a glass, e.g., as shown in the drawings, or may include a portion of the vacuum sealed space 158. As described above, the upper rim 114 may include an upper sidewall 116 and a lip 134 that extends around an outer perimeter of the second wall 130b. The lower rim 138 may extend to a base 140. The base 140 may include a fitting 144. In this embodiment, the fitting 144 comprises a hole 146 defined in the base 140, as described above with respect to FIG. 2. The first and second walls 130a, 130b may taper from the upper rim 114 to the lower rim 138.

The first wall 130a includes an inner sidewall 131b that at least partially defines the interior volume 110 and an outer sidewall 132a. The second wall 130b includes and inner sidewall 132b and an outer sidewall 131a. The outer sidewall 131a is the outermost wall and may form a portion of the profile shape of the vessel 100. Insulation may be positioned between the first and second walls 130a, 130b. For example, a sealed volume 158 is positioned at least partially between the first and second walls 130a, 130b. As shown, the outer sidewall 132a of the first wall 130a and the inner sidewall 132b of the second wall 130b at least partially define the sealed volume 158. In various embodiments, the sealed volume 158 may be an insulation volume to prevent conduction or heat transfer between the walls 130a, 130b. In one example, the sealed volume 158 may be maintained at a vacuum pressure. In the illustrated embodiment, the base 140, vessel floor 156, lower rim 138, upper rim 114, and first and second walls 130a, 130b together define the sealed volume 158. In this embodiment, the first and second walls 130a, 130b, upper and lower rim 138, fitting 144, and vessel floor 156 comprise borosilicate glass. However, in other embodiments, other glasses or materials, including composites, may be used, such as those described above with respect to FIGS. 2 & 3 and elsewhere herein may be used.

Figure 7:
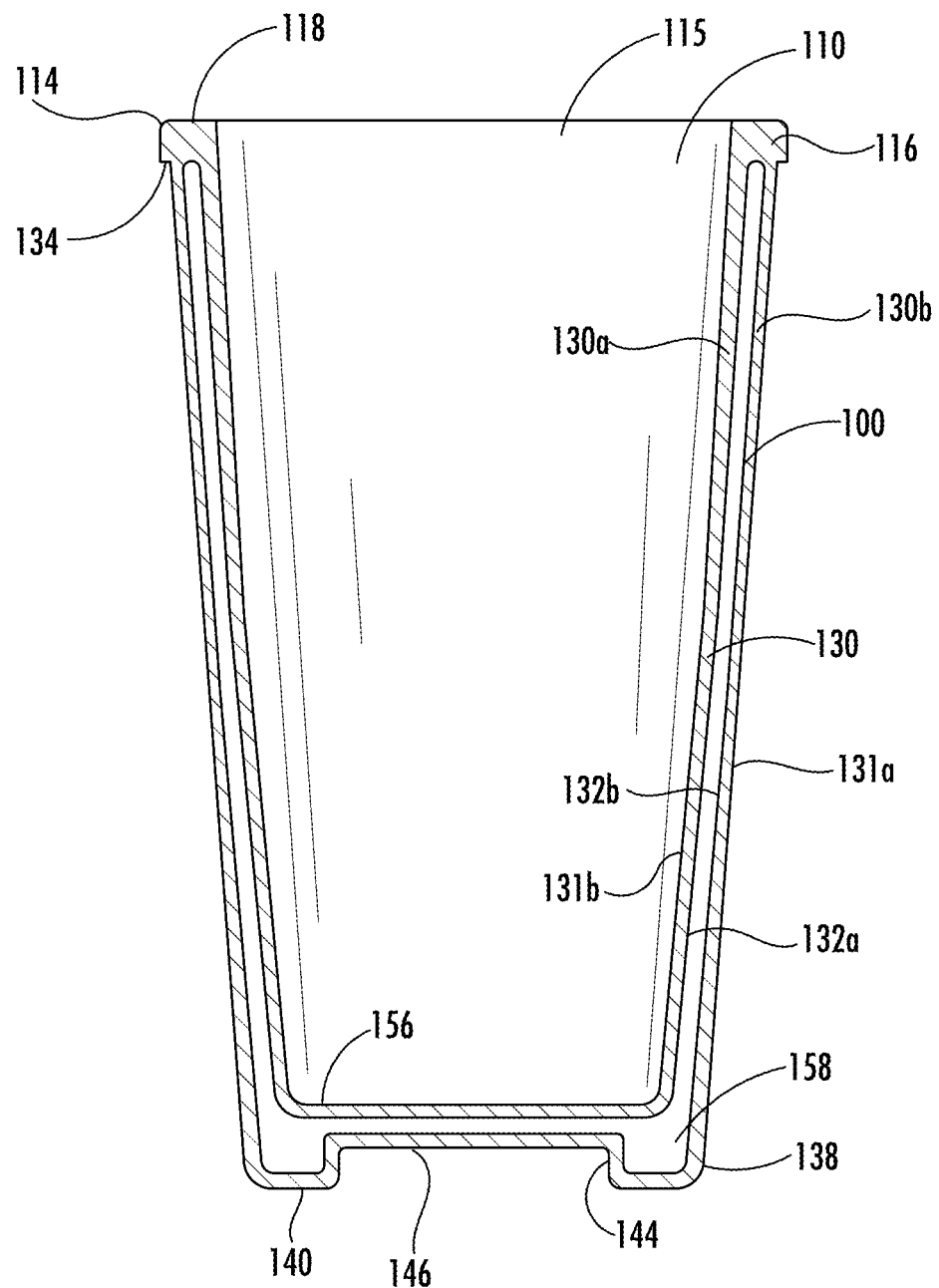
FIG. 7 is a cross-section view of a vessel of a modular beverage container system having a double wall configuration according to various embodiments described herein.
Figure 8:
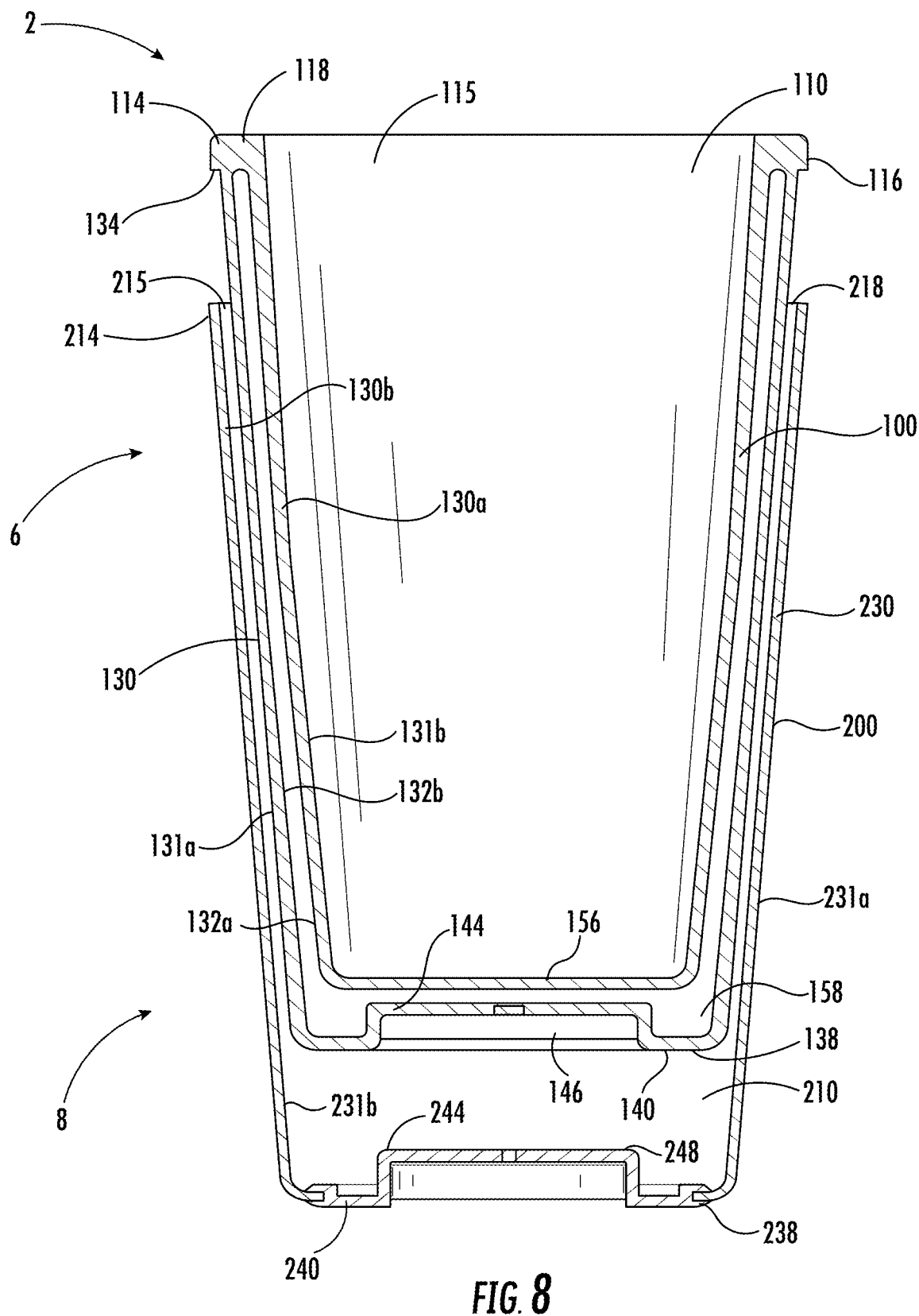
FIG. 8 is a cross-section view of the assembly/disassembly of the shell and vessel of FIG. 9 according to various embodiments described herein.

FIG. 8 illustrates an intermediate assemble/disassembly of the vessel 100 shown in FIG. 7 and the shell 200 shown in FIG. 4. The vessel 100 and shell 200 may be removably coupled by inserting the vessel 100 into the interior volume 210 of the shell 200 and pressing the projection 248 into hole 146. As noted above, the corresponding fittings 144, 244 and walls 130, 130a, 130b, 230 may be dimensioned such that the upper rim 214 of the shell 200 engages the lip 134 of the upper rim 114 of the vessel 100 when a suitable press fit has been achieved. In other embodiments, the vessel 100 and shell 200 may be press fit prior to the upper rim 214 of the shell 200 engaging the lip 134 of the upper rim 114 of the vessel 100.

Figure 9:
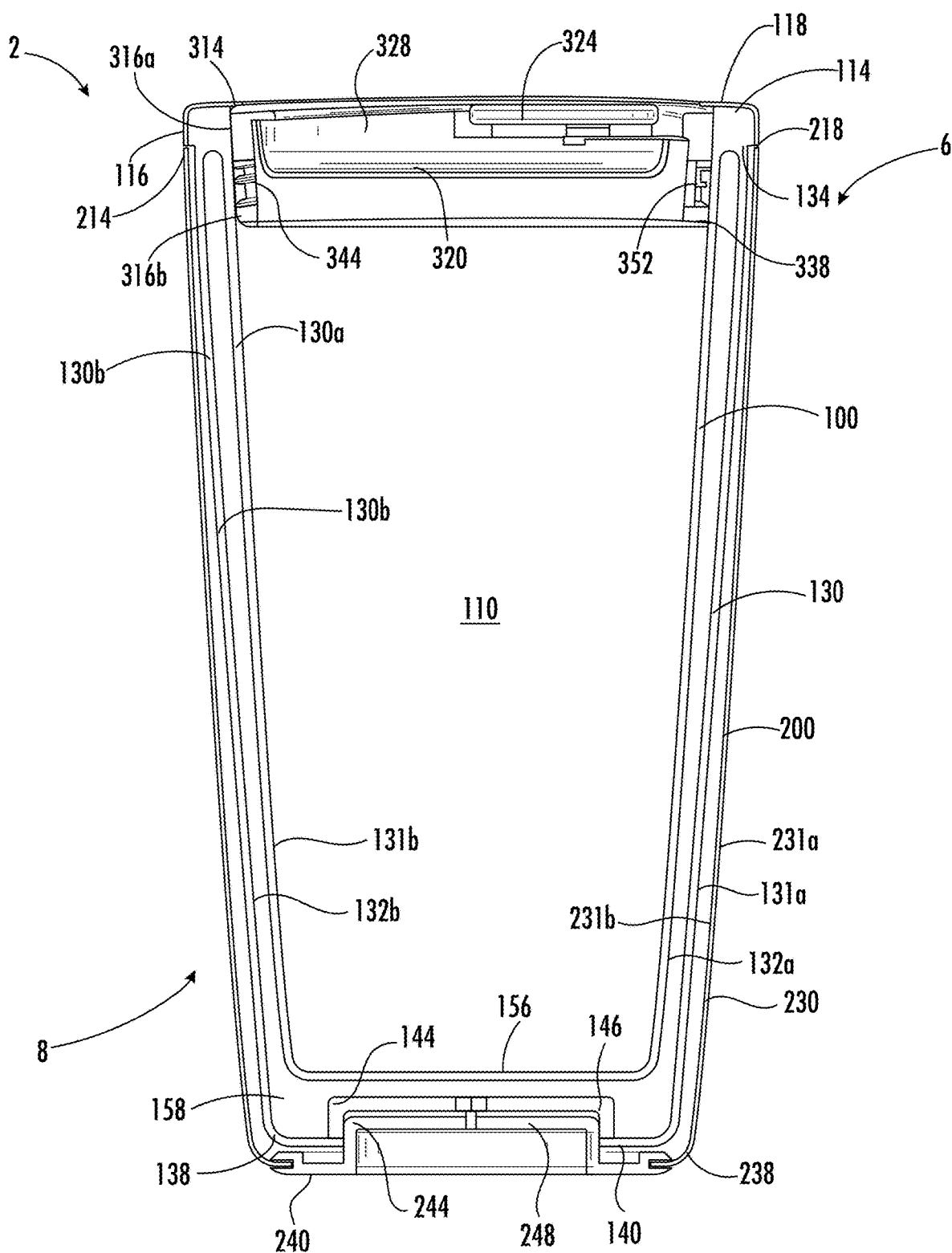
FIG. 9 is a cross-section view of an assembled modular beverage container system including a lid according to various embodiments described herein.

FIG. 9 illustrates a cross-section of the modular beverage container system 2 according to one embodiment. The modular beverage container system 2 includes a vessel 100, shell 200, and lid 300. As shown, the vessel 100, shell 200, and lid 300 are removably coupled in an assembled configuration. The vessel 100 includes a double wall configuration, as described above with respect to FIG. 7. The shell 200 is similar to that described with respect to FIG. 4.

The vessel 100 and shell 200 may be assembled in a manner similar to that described with respect to FIG. 8 or elsewhere herein. As shown, vessel 100 is positioned within the interior volume 210 of the shell 200. Projection 248 of the shell 200 fitting 244 is press fit within hole 146 of the vessel 100 fitting 144 to removably couple the vessel 100 within the interior volume 210 of the shell 200. The inner sidewall 231b of the shell 200 is positioned adjacent to the outer sidewall 131a of the vessel 100. The upper rim 214 of the shell 200 is positioned adjacent to or is engaged with the upper rim 114 of the vessel 100 along the lip 134. The upper rim 114 of the vessel 100 extends outwardly to position over the upper rim 214 of the shell 200 and is approximately outwardly flush therewith. The upper sidewall 116 of the upper rim 114 of the vessel 100 is exposed along the outer perimeter profile of the assembled modular beverage container system 2. To disassemble the vessel 100 and shell 200, a user may grip the vessel 100 and shell 200 and pull the vessel 100 from the interior volume 210 of the shell 200. Pulling the vessel 100 from the interior volume 210 of the shell 200 with sufficient force overcomes the press fit and removes the projection 248 from the hole 146 and allows the vessel 100 to be removed from the interior volume 210 of the shell 200. When the upper rim 114 of the vessel 100 is positioned above the upper rim 214 of the shell 200 when removably coupled in an assembled configuration, the upper rim 114 of the vessel 100 may provide a region upon which a user may grip the vessel 100 during coupling and uncoupling of the vessel 100 and the shell 200. In some such embodiments, the upper rim 114 may be contoured to provide better grip. In this or another example, the upper rim 114 of the vessel 100 may extend outwardly beyond the upper rim 214 of the shell 200 when the vessel 100 and shell 200 are removably coupled in an assembled configuration.

As described above and elsewhere herein, in some embodiments, the upper rim 114 of the vessel 100 may not include a lip 134. In one such example, the modular beverage container system 2 or vessel 100 and shell 200 thereof may be configured to position the upper rim 114 above, flush with, or below the upper rim 214 of the shell 200 when vessel 100 and shell 200 are removably coupled in an assembled configuration.

The lid 300 illustrated in FIG. 9 may be similar to that described herein with respect to FIG. 6 and may include an upper rim 314 and a lower rim 338. An upper sidewall 316a extends from the upper rim 314 and a lower sidewall 316b extends from the lower rim 338. A groove 350 is defined along an outer perimeter of the lid 300 between the upper sidewall 316a and the lower sidewall 316b. A fitting 344 extends within the groove and defines a cross-section dimension slightly larger than a cross-section dimension across the interior volume 110 defined by an interior perimeter of the inner sidewall 131b. The fitting 344 comprises a seal gasket 352 including three annular projections 348 defining an outer perimeter of the lid 300, outward of the groove 350. The projections 348 comprise a resiliently compressible elastomeric material such as silicone configured to compress against the inner sidewall 131b and provide a friction fit therewith. The engagement of the projections 348 with the inner sidewall 131b may removably couple the lid 300 over the interior volume 110 and provide a seal to prevent leakage between the fitting 344 and the wall 130a. In some embodiments, greater or fewer projections 348 projections may be used. Projections 348 may also be integral with respect to the lid 300 or may be modular and configured to securely couple within the groove 350 or otherwise.

In some embodiments, the modular beverage container system 2 may utilize other configurations to removably couple the vessel 100 and shell 200. Various example configurations are described below with general reference to FIGS. 2 & 9.

In one example configuration, the vessel 100 and shell 200 include profiles along the outer sidewall 131a and inner sidewall 231b configured to removably couple. For example, the shell 200 and vessel 100 may include corresponding fittings 144, 244 formed by respective sidewalls 131a, 231b configured to be press fit. In one example, the shell 200 may include a fitting 244 comprising a hole wherein the hole is defined by the inner sidewall 231b and includes all or a portion of the interior volume 210. The vessel 100 may include a fitting 144 comprising the outer sidewall 131a wherein all or a portion of an outer perimeter defined by the outer sidewall 131a comprises the projection having a cross-section larger than a cross-section of the hole. The projection may include the complete outer perimeter or may include bumps or textured surfaces along the outer sidewall 131a. In a further example, one or more projections are positioned along the inner sidewall 231b and define a cross-section of the interior volume 210 that is less than a corresponding cross-section defined by a corresponding perimeter of the vessel 131a defined by the outer sidewall 131a to frictionally engage the outer sidewall 131a and press fit the vessel 100 within the interior volume 210 shell of the 200. Thus, the outer perimeter of the vessel 100 and the interior volume 210 of the shell 200 may include cross-sections configured to be press fit in a manner similar to that described above (see, e.g., FIGS. 2, 8 & 9) with respect to the corresponding fittings 144, 244 positioned along the bases 140, 240 of the vessel 100 and shell 200.

In various example configurations, the fittings 144, 244 may comprise threads configured to threadably engage to thereby removably couple the vessel 100 and the shell 200. For example, the outer sidewall 131a may include threads positioned to threadably engage corresponding threads positioned along the inner sidewall 231b. In a further example, a projection extends from the base 240 of the shell 200, which may be similar in location to projection 248. A corresponding hole may be positioned along the base 140 of the vessel 100, which may be similar in location to hole 146. The projection may define threads around its circumference that correspond to threads defined around the circumference of the sides defining the hole. Thus, the vessel 100 may be positioned within the interior volume 210 of the shell 200 and rotated in a first direction to couple the vessel 100 within the interior volume 200 and subsequently rotated in a second direction to uncouple the vessel 100 from within the interior volume 210.

In some example configurations, the shell 200 may include an actuator configured to actuate a fitting 244 comprising a projection. In one example, the projection may be extendable and retractable relative to the inner sidewall 231b, base 240, or other region of the interior volume 210. For example, actuating the projection expand or reduce a dimension or volume of a projection or may extend the projection into the interior volume 210 to compress against the outer sidewall 131a of the vessel 100 or within a fitting 144 comprising a slot defined by the sidewall 131b or base 140. In a further example, actuating the fitting 244 may extend a projection outward from another projection extending from the base 240, which may be similar in location to projection 248, to compress against one or more sides of a hole along base 140, which may be similar to hole 146, or to be received within a slot formed along a side of the hole. In various embodiments, the projection may be actuated by rotating a knob, flipping a lever, or by pushing a button, for example, that is operatively coupled to the projection.

In various example configurations, the vessel 100 and shell 200 include fittings 144, 244 comprising a slot and a projection receivable through the slot. In one example, the slot extends vertically along inner sidewall 131b and is positioned to receive a projection extending from outer sidewall 231a. The depth of the slot may decrease from the lower rim 138 toward the upper rim 114 to compress the projection against a base of the slot. In another example, the slot comprises a decreasing width from the lower rim 138 toward the upper rim 114 configured to compress the projection between the width of the slot. In a further example, the projection includes a wedge profile. In another example, the slot may extend vertically and include a horizontal component. For example, the projection may slide vertically through the slot during initial insertion of the vessel 100 or after initial decoupling. The vessel 100 may be rotated when the projection is within the horizontal portion of the slot. For example, the slot may comprise a twist lock configuration wherein the vessel 100 may be rotated in a single plane or through multiple planes, e.g., the slot may include a combination of or combined vertical and horizontal such as an "L", "J", or spline curve. The horizontal component of the slot may be used to improve the coupling of the vessel 100 and the shell 200. In a further example, a projection may extend from another projection that extends from the base 240, which may be similar in location to projection 248. The projection may be received within a slot formed along a side of the hole formed in the base 140 of the vessel 100. The slot may include a twist lock configuration and may include an initial vertical component for receiving and releasing the projection and one or more horizontal components, which may include vertical components, for coupling and uncoupling the vessel. In still another embodiment, the base 240 may include one or more projections positioned to be received within corresponding slots formed in base 140. The slots may include a decreasing width to compress the projections within the width when the vessel 100 is rotated in a first direction and to relieve compression when the vessel is rotated in a second direction to move the projections through an increasing slot width. In another example, wall 230 is resiliently deformable to allow a user to temporarily deform the wall 230 to position or remove a projection extending from the outer sidewall 131a into or from a slot defined along the inner sidewall 231b.

In some example configurations, a fitting 144, 244 includes a piston or diaphragm in fluid communication with the interior volume 210 of the shell 200. For example, the piston or diaphragm may be disposed along outer sidewall 231a or base 240. The piston or diaphragm may be actuated to increase the interior volume 210. Thus, when the vessel 100 is received within the interior volume 210, actuation of the piston or diaphragm may increase volume between the vessel 100 and shell 200 to generate a vacuum pressure environment that removably couples the vessel 100 within the interior volume 210. In some examples, the upper rims 114, 214 may be configured to sealingly engage when the vessel 100 is inserted into the interior volume 210. For example, a compressible seal may extend around lip 134 to engage the upper surface 218 of the upper rim 214 of the shell 200. In various embodiments, the piston or diaphragm may be actuated by rotating a knob, flipping a lever, or by pushing a button, for example, that is operatively coupled to the piston or diaphragm. To piston or diaphragm may be similarly actuated, deactuated, or released from actuation in a similar manner to return the interior volume 210 to a previous volume and increase pressure therein to allow removal of the vessel 100 from the interior volume 210.

In some example configurations, the vessel 100 and shell 200 may comprise fittings 144, 244 configured for snap fitment. In another example configuration, the vessel and shell may comprise fittings 144, 244 configured for hook and loop coupling.

It will be appreciated that the various fitting configurations described herein may be reversed with respect to the vessel 100 and shell 200. For example, in one embodiment, a fitting 244 of the shell 200 may define one or more holes configured to receive and thereby press fit with one or more corresponding fittings 144 of the vessel 100 comprising one or more projections. In various embodiments, a fitting 244 of the shell 200 may define one or more holes and one or more projections configured to receive and thereby press fit with one or more corresponding fittings 144 of the vessel 100 comprising one or more projections and one or more holes.

As introduced above with respect to FIG. 1, in some embodiments, the modular beverage container system 2 may include a cap 324. With reference again to FIG. 6, the cap 324 may be selectively slidable with respect to the opening 322 between an open position, as shown, and a closed position wherein the cap 324 is slidable radially outward, toward the upper rim 114, to thereby cover the opening 322 and radially inward, away from the upper rim 114, to thereby uncover the opening 322. In the illustrated embodiment, the cap 324 is recessed with respect to an upper surface 318 of the lid 300. In other embodiments, the cap 324 may be positioned level with or above the upper surface 318.

Figure 10:
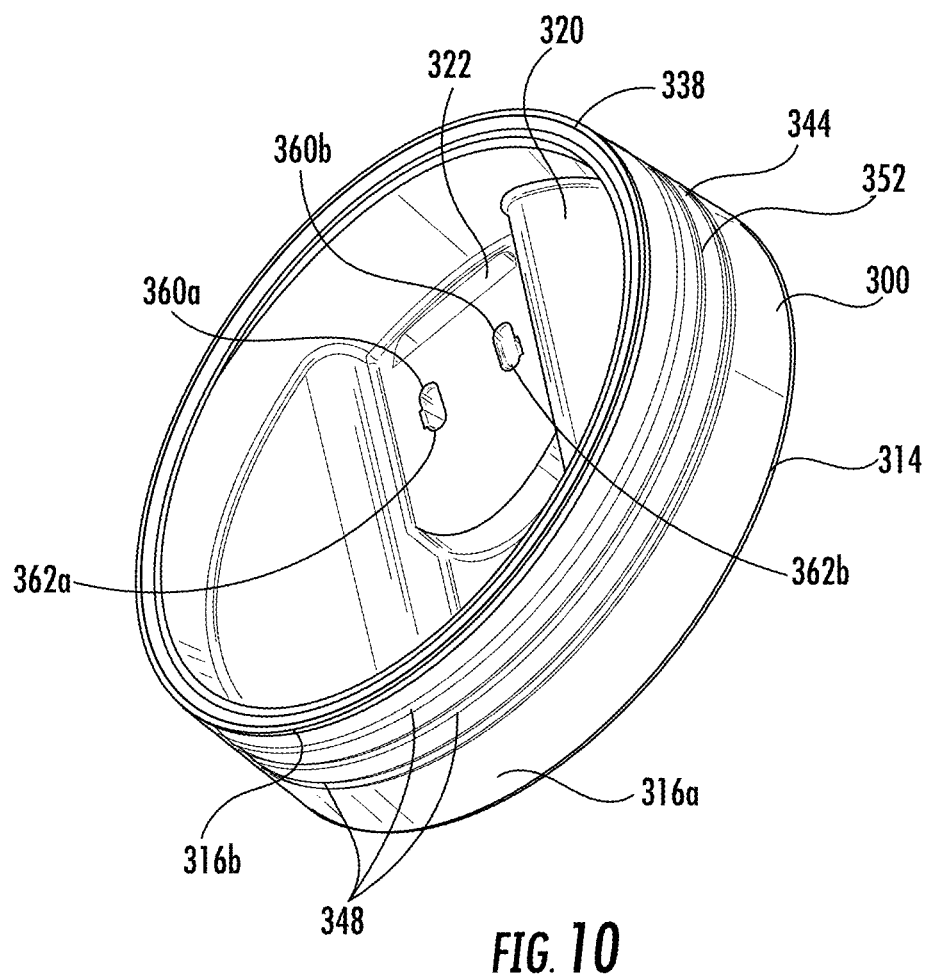
FIG. 10 is a perspective view of a lower end of a lid according to various embodiments described herein.

With further reference to FIG. 10 illustrating a bottom view of a lid 300, the lid 300 defines one or more slots 360a, 360b into which one or more tabs 362a, 362b extending from the cap 324 may slidably couple. The one or more slots 360a, 360b may define the allowed movement of the cap 324 relative to the rest of the lid 300 or opening 322. For example, cap 324 may be urged in a first direction wherein the one or more tabs 362a, 362b slide through the one or more slots 360a, 360b in a first direction to cover the opening 322 and transition the cap 324 from the open position to the closed position. The cap 324 may be urged in a second direction wherein the one or more tabs 362a, 362b slide through the one or more slots 360a, 360b in a second direction, opposite the first, to uncover the opening 322 and transition the cap 324 from the closed position to the open position. It will be appreciated that in some embodiments, the lid 300 may include one or more tabs that couple within slots defined by the cap 324 to thereby slidably couple the lid 300 and cap 324 in a similar manner.

In some embodiments, other configurations may be used for covering the opening 322. For example, the cap 324 may be slidable through a slot defined by the lid 300 wherein the slot includes tabs or rails that slidably position over an upper surface 318 of the cap 324 or within slots defined along lateral sides of the cap 324. In another example, the cap 324 may be snapped into place over the opening 322 to close the opening 322 and may be removed by lifting the cap 324 from the opening 322. For example, the cap 324 may be press fit into or over the opening 322 in a closed position and pulled from the opening 322 in a closed position. In one example, the cap 324 may be separated from the lid 300 or may be connected to the lid 300 by a strap to prevent the cap 324 from being misplaced in the open position. In a further example, the cap 324 may be coupled to the lid 300 by a hinge along one end allowing another end of the cap 324 to be pivoted upwardly, away from the lid 300, to uncover the opening 322 in an open position and downwardly, toward the opening 322 to position over the opening 322 and thereby cover the opening 322 in a closed position. In a further example, the cap 324 may be coupled to the lid 300 by a hinge or pivot and may be pivoted to rotate the cap 324 within approximately the same major plane as the cap 324 between open and closed positions.

As introduced above, the lid 300 may be configured to removably couple over the interior volume 110 of the vessel 100. The lid 300 may include a fitting 344 configured to assist in removably coupling the lid 300 over the interior volume 110 of the vessel 100. For example, the lid 300 may include projections 348 configured to compress against the inner sidewall 131b. The extensions may be integral or modular with respect to the lid 300. For example, as depicted in FIGS. 2 & 9, a lid 300 may include a fitting comprising a seal having one or more projections 348 configured to securely position around the lid 300 and thereon be compressed against a smaller interior cross-section of the inner sidewall 131b to press fit the lid 300 within the interior volume 110 of the vessel 100. In a further embodiment, the lid 300 includes a flange that extends over one or both of the upper rims 114, 214 of the vessel 100 and shell 200. In still a further embodiment, the flange includes a skirt portion that further extends around an outer perimeter of one or both walls 130, 230 of the vessel 100 and shell 200. In one example, the skirt may compress against the adjacent sidewalls 131a, 231b of the vessel 100 or shell 200 to improve the coupling over the interior volume 110 of the vessel 100.

FIGS. 11-14 illustrate further embodiments of the modular beverage container system 2 and components thereof.

Figure 11:
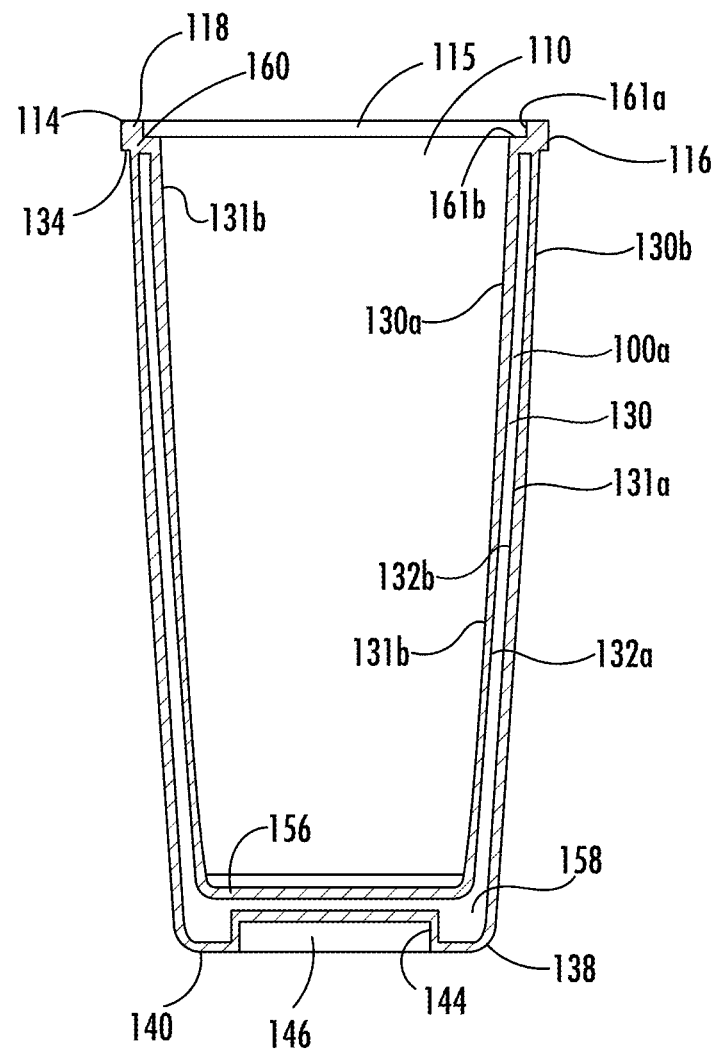
FIG. 11 is a cross-section view of a vessel of a modular beverage container system having a double wall configuration according to various embodiments described herein.

FIG. 11 illustrates a vessel 100a according to various embodiments. Vessel 100a may be similar to vessel 100 wherein like features are identified by like numbers. It will be appreciated that descriptions provided above and elsewhere herein with respect to vessel 100 may similarly apply to vessel 100a and vice versa.

The vessel 100a includes a wall 130 defining an interior volume 110. In the illustrated embodiment, the wall 130 includes inner and outer wall 130a, 130b defining a sealed volume 158 to which a vacuum is maintained as described above. In other embodiments, the wall 130 may not include a double wall configuration or may include insulation material in addition to or instead of a gas situated between two or more walls. The wall 130 extends to an upper rim 114 that extends around an upper perimeter of the vessel 100a. The vessel 100a may be constructed from one or more materials, such as a glass or other material or combination of materials identified above and elsewhere herein with respect to vessel 100. The upper rim 114 of the vessel 100a may comprise a solid material, such as a glass, e.g., as shown in the drawings, or may include a portion of the vacuum sealed space 158.

The vessel 100a includes a groove 160 defined along the upper rim 114. The groove 160 is comprises an interiorly positioned recessed rim of the upper rim 114 and may be dimensioned to form a seat for a lip of a lid. The groove 160 includes an interior sidewall 161a that extends around an outer perimeter of the groove 160. The interior sidewall 161a extends generally vertically from a base 161b of the groove 160. The base 161b may extend generally horizontally with respect to the conventional orientation of the vessel 100a. The base 161b and interior sidewall 161a are illustrated as having smooth surfaces; however, in some embodiments the base 161b, interior sidewall 161a, or both may have a textured surface. Textured surfaces may provide friction or surfaces configured to interlock with a lip of a lid.

Figure 12A:
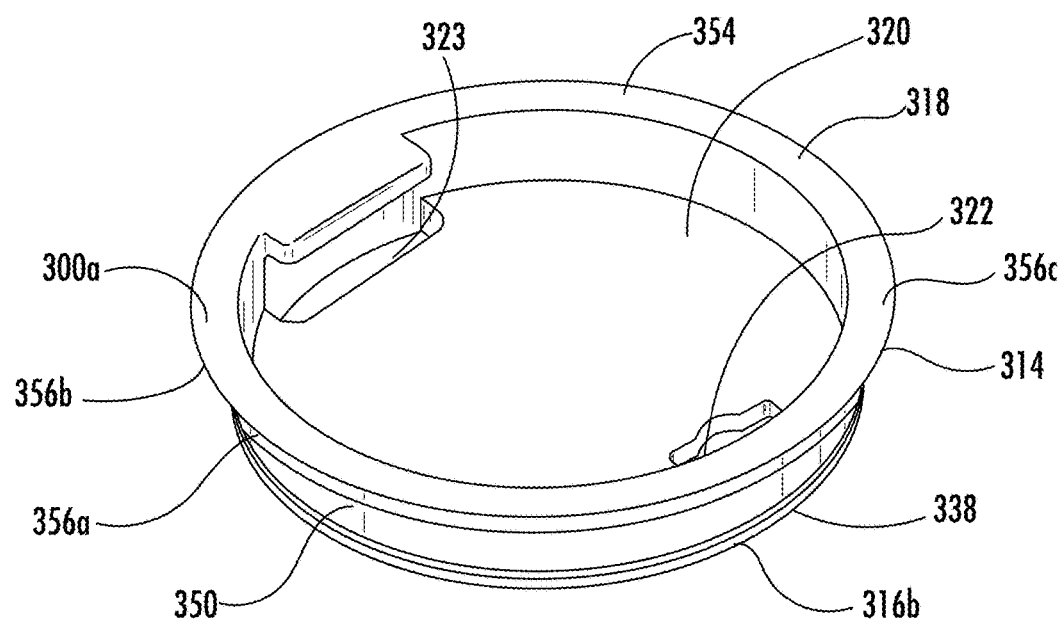
FIG. 12A is a perspective view of a lid for a modular beverage container system according to various embodiments described herein.
Figure 12B:
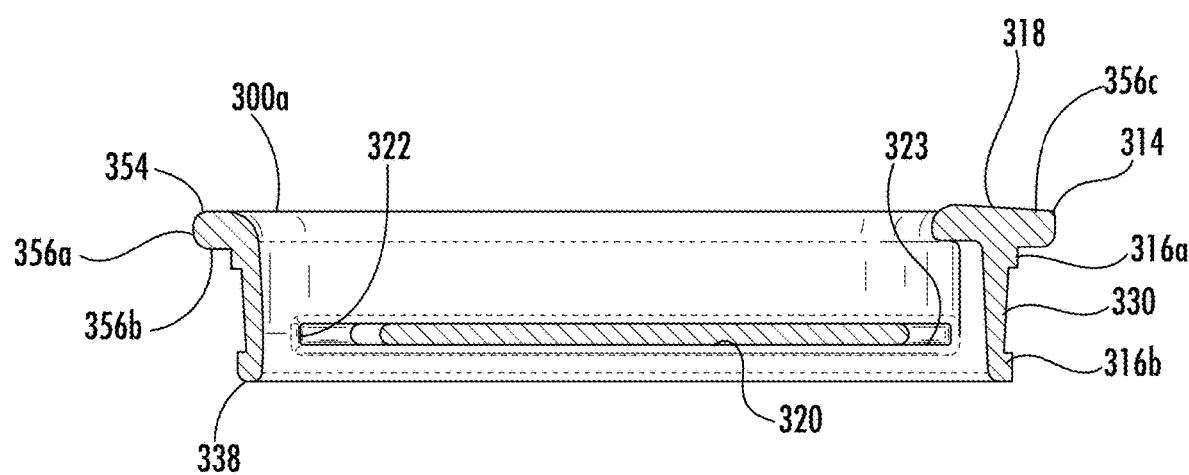
FIG. 12B is a cross-section view of the lid shown in FIG. 12A according to various embodiments described herein.
Figure 13:
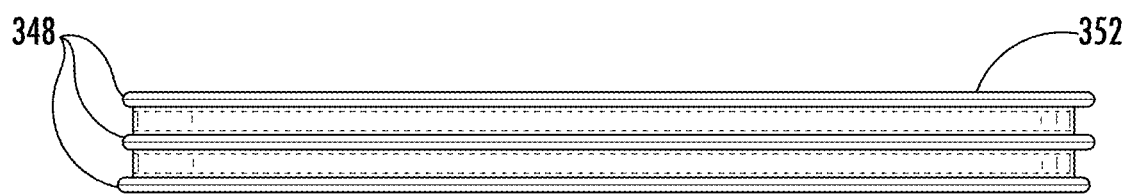
FIG. 13 is an elevated view of a seal gasket for a modular beverage container system according to various embodiments described herein.

FIGS. 12A & 12B illustrate a lid 300a according to various embodiments. Lid 300a may be similar to lid 300 wherein like features are identified by like numbers. It will be appreciated that descriptions provided above and elsewhere herein with respect to lid 300 may similarly apply to lid 300a and vice versa. Lid 300a may be configured to removably couple over the interior volume 110 of the vessel 100.

Figure 14:
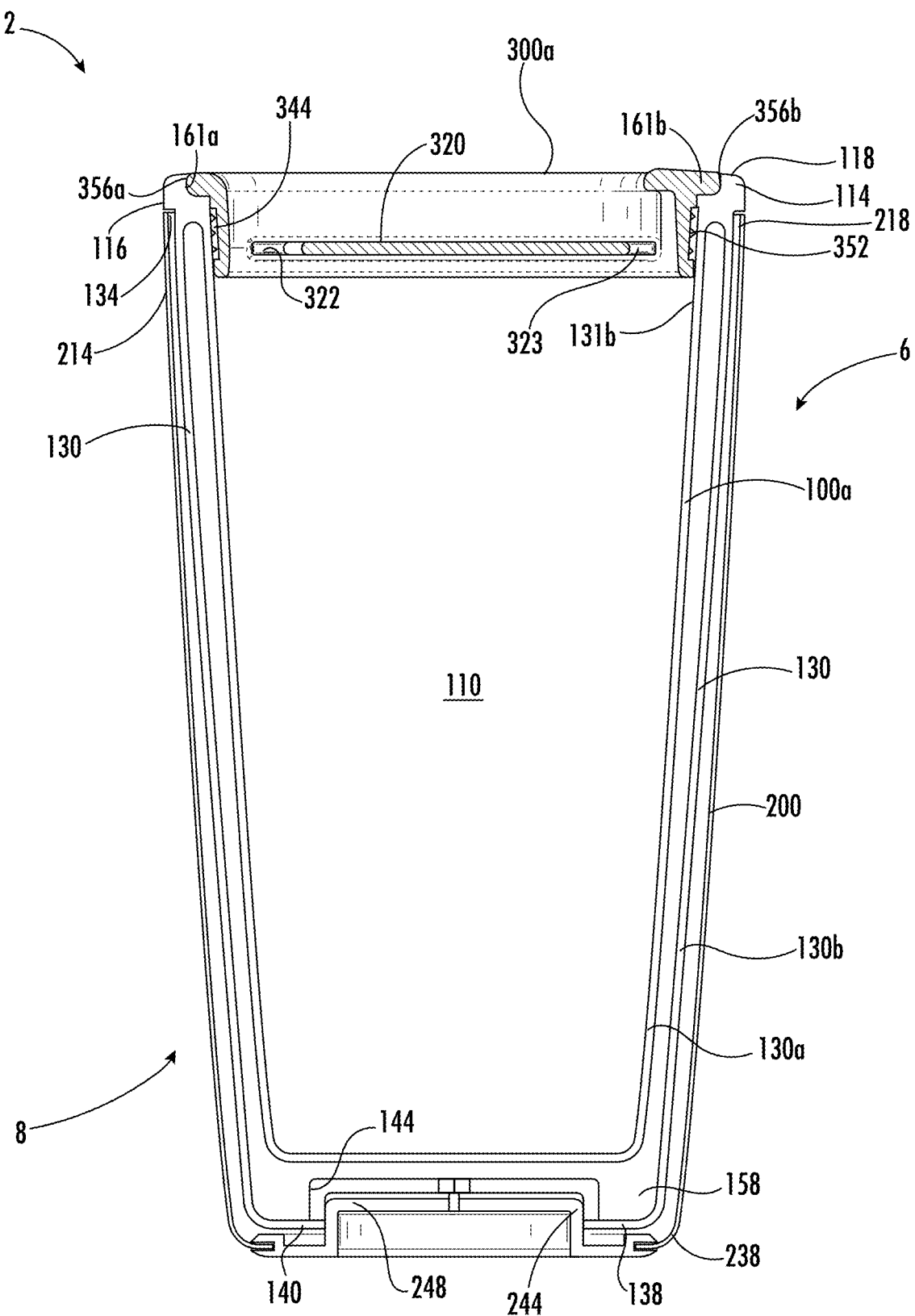
FIG. 14 is a cross-section view of an assembled modular beverage container system including a lid according to various embodiments described herein.

With further reference to FIG. 14, illustrating a cross-section view of an assembled modular beverage container 2 including vessel 100a removably received within the interior volume 210 of a shell 200 and including an optional lid 300a removably received along the upper rim 114 of the vessel 100a, the lid 300a may be configured to removably couple along the upper rim 114 of vessel 100a to provide an approximately flush fit with the upper surface 118 of the upper rim 114. In other embodiments, lid 300a may be configured to be received along the upper rim 114 of the vessel, such as vessel 100 or vessel 100a, to provide an approximately flush fit with sidewall 116 of the upper rim 114 or extend outwardly beyond sidewall 116.

The lid 300a includes a partition wall 320 for at least partially partitioning the interior volume 110 of a vessel 100, 100a from an exterior environment when received therein. The lid 300a may also include an upper rim 314 and a lower rim 338. One or more sidewalls 316a, 316b may extend between the upper rim 314 and lower rim 338. The partition wall 320 defines an opening 322 through which liquid may flow into or out of the interior volume 110 of the vessel 100a. The lid 300a may also include an air slot 323, which may be defined by the partition wall 320, to allow air to flow into the interior volume 110 of the vessel 100a to maintain pressure within the vessel 100a suitable for outflow of liquid. In some embodiments, the lid 300a may also include a cap (not shown) that is positionable over or through the opening 322 and/or air slot 323 to prevent passage of liquid through the opening 322 or air slot 323. In some embodiments, however, the lid 300a does not include an air slot 232, e.g., the opening 322 may be dimensioned to be large enough to allow suitable flow of air during outflow of liquid during drinking.

Assembling the modular beverage container system 2 may include removably coupling the lid 300a over the interior volume 110 of the vessel 100a. Accordingly, various embodiments of the lid 300a may include a fitting 344 (see FIG. 14), configured to assist in removably coupling the lid 300a over the interior volume 110 of the vessel 100a. For example, the lid 300a may include a fitting 344 comprising an outer perimeter having a cross-section slightly larger than a cross-section of an interior perimeter of the vessel 100a. The outer perimeter may comprise a resiliently compressible material configured to assist in a friction fit to thereby press fit the fitting 344 within the smaller cross-section of an interior perimeter of the interior volume 110 defined by the inner sidewall 131b of the vessel 100a. In some embodiments, the interior perimeter of the vessel 100a along the inner sidewall 131b, the outer perimeter of the fitting 344, or both may include a cross-section that tapers such that the cross-section along a lower portion of the fitting 344 is smaller than a cross-section along an upper portion of the interior perimeter of the interior volume defined by the inner sidewall 131b to assist in guiding and thereby compressing the fitting 344 against the sidewall 130 within a smaller lower portion of the interior perimeter of the interior volume defined by the inner sidewall 131b. In FIG. 14, the fitting 344 comprises one or more projections 348 defining an outer perimeter of the lid 300a. The projections 348 are configured to compress against the interior perimeter of the inner sidewall 131b when inserted therebetween. The projections 348 may be integral or modular with respect to the lid 300a.

With reference again to FIGS. 12A & 12B, lid 300a defines a perimeter groove 350 that opens outwardly and extends around the lid 300a between an upper sidewall 316a and a lower sidewall 316b. The groove 350 may be configured to receive a gasket to form fitting 344. As further shown in FIG. 13, a gasket such as seal gasket 352 may be received within groove 350. The seal gasket 352 includes three annular projections 348 and is dimensioned to be securely positionable within the groove 350 to extend along the outer perimeter of the lid 300a and therefrom engage the inner sidewall 131b along the interior perimeter of the interior volume 110 to provide a seal therebetween when the fitting 344 is compressed against the sidewall 131b of wall 130, e.g., as shown in FIG. 14 and described above with respect to FIGS. 6 & 9. The projections 348 may comprise a resiliently compressible elastomeric material such as silicone configured to provide a friction fit when compressed against the inner sidewall 131b. The outer perimeter of the lid 300a tapers from the upper sidewall 316a toward the lower sidewall 316b. In one embodiment, the lid 300a does not taper. In some embodiments, a gasket such as seal gasket 352 may be received around a perimeter of the lid 300a that does not include a groove 350 or may be received interiorly of the perimeter and extend outwardly through holes in side walls to form fitting 344.

The upper rim 314 of the lid 300a may include a lip 354 comprising a flange dimensioned to be received within the recessed groove 160 of the upper rim 114 of the vessel 100a (see, e.g., FIGS. 11 & 14). The lip 345 may extend outwardly beyond the upper sidewall 316a to define an outer cross-section or diameter greater than an outer cross-section or diameter defined along the upper sidewall 316a. The lip 354 may include an outer sidewall 356a and an underside wall 356b. The outer sidewall 356a may extend around the outer perimeter of the lip between an upper wall 356c of the lip 354 and underside wall 356b. In some embodiments, the upper wall 356c partially corresponds to the upper surface 318 of the upper rim 314.

With specific reference to FIG. 14, the modular beverage container system 2 may include a vessel 100a configured to be removably received within the interior volume 210 of a shell 200, in a manner similar to that described above and elsewhere herein, and optionally include a lid 300a that may be removably received along the upper rim 114 of the vessel 100a. It will be appreciated that in some embodiments, the lid 300a may be removably received within a deeper portion of the inner volume 110 of the vessel 100a. Shell 200 may be similar to shell 200 described elsewhere herein. In the illustrated embodiment, the upper rim 114 positions above the upper rim 214 of the shell 200, exposing sidewall 116 of the upper rim 114 along an upper end 6 of the modular beverage container 2 when assembled. The interior sidewall 161a of groove 160 of the upper rim 114 of the vessel 110a may define an inner cross-section or diameter corresponding to the outer cross-section or diameter defined by the outer sidewall 356a of the lip 354 such that when the lid 300a is removably coupled over the interior volume 110 of the vessel 100a, the outer cross-section or diameter defined by the outer sidewall 356a of the lip 354 corresponds with the inner cross-section or diameter defined by the interior sidewall 161a of the groove 160 and the lip 354 is thereby received within the groove 160. In some embodiments, the interior sidewall 161a of the groove 160 is configured with a height corresponding to a height of the outer sidewall 356a of the lip 354 such that the upper surface 118 of the vessel 100a and the upper surface 318 or upper wall 354 of the lid 300a are approximately flush when the lid 300a is received within the vessel 100a. When the lip 354 is received within the groove 160 the underside wall 356b of the lip 354 may engage or seat on the base 161b of the groove 160. In some embodiments, the distance the underside wall 356b extends from the upper sidewall 316a approximates the distance the base of the groove extends between the inner sidewall 131b and the interior sidewall 161a.

Thus, modular beverage container system may include a lid configured to position within the upper rim of the vessel, approximately flush with an upper surface thereof. As described elsewhere herein, some embodiments may include other lid configurations, such as those wherein the lid extends over the upper rim of the vessel and/or the upper rim of the shell, or upper surfaces thereof, when the modular beverage container system is in an assembled configuration.

Figure 15:
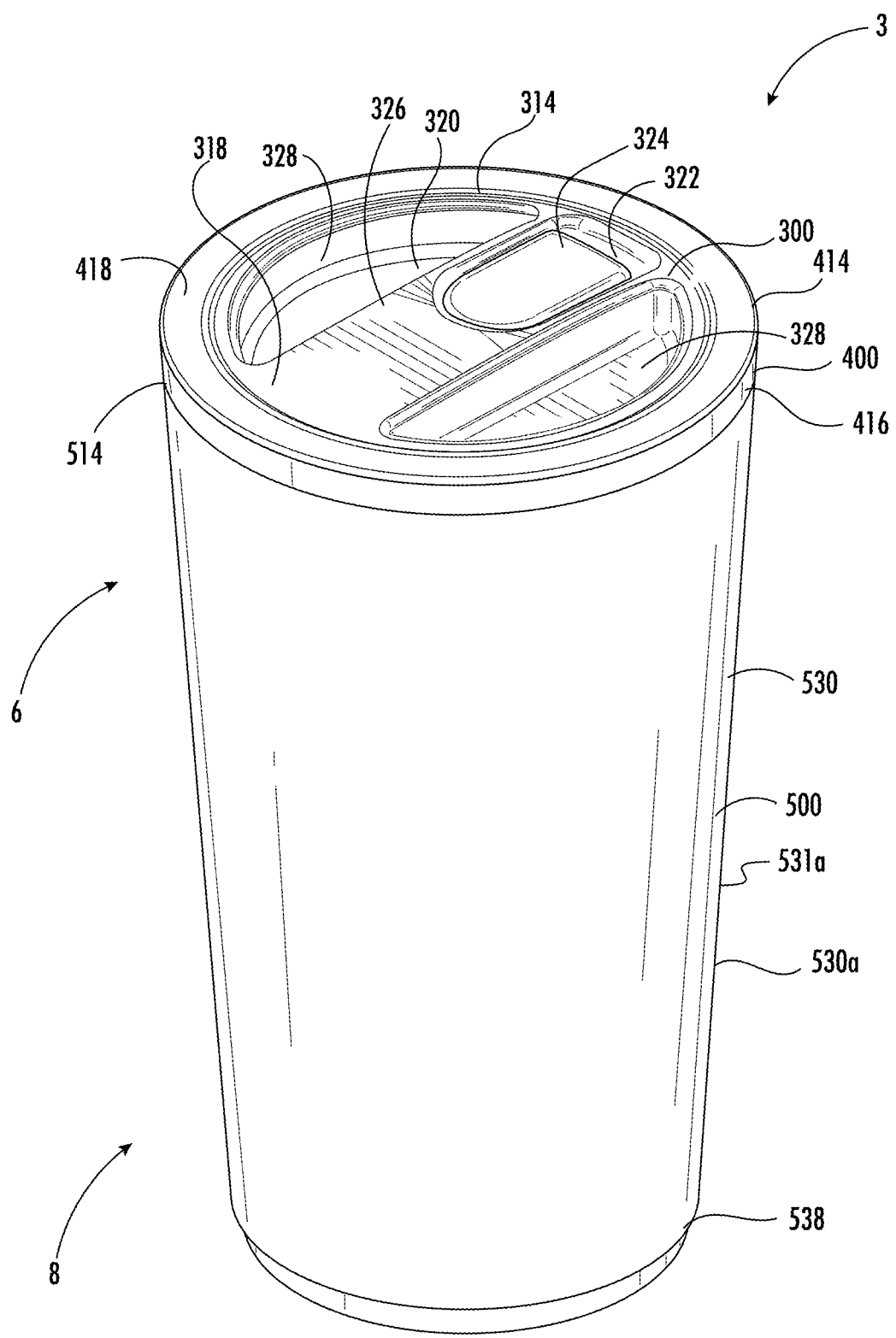
FIG. 15 is a perspective view of a modular beverage container system including shell having a multi-wall configuration according to various embodiments described herein.

FIG. 15 illustrates another embodiment of a modular beverage container system 3 in an assembled configuration. FIGS. 16-27 illustrate various embodiments of the modular beverage container system 3 and components thereof, wherein like features are identified by like numbers.

Figure 17:
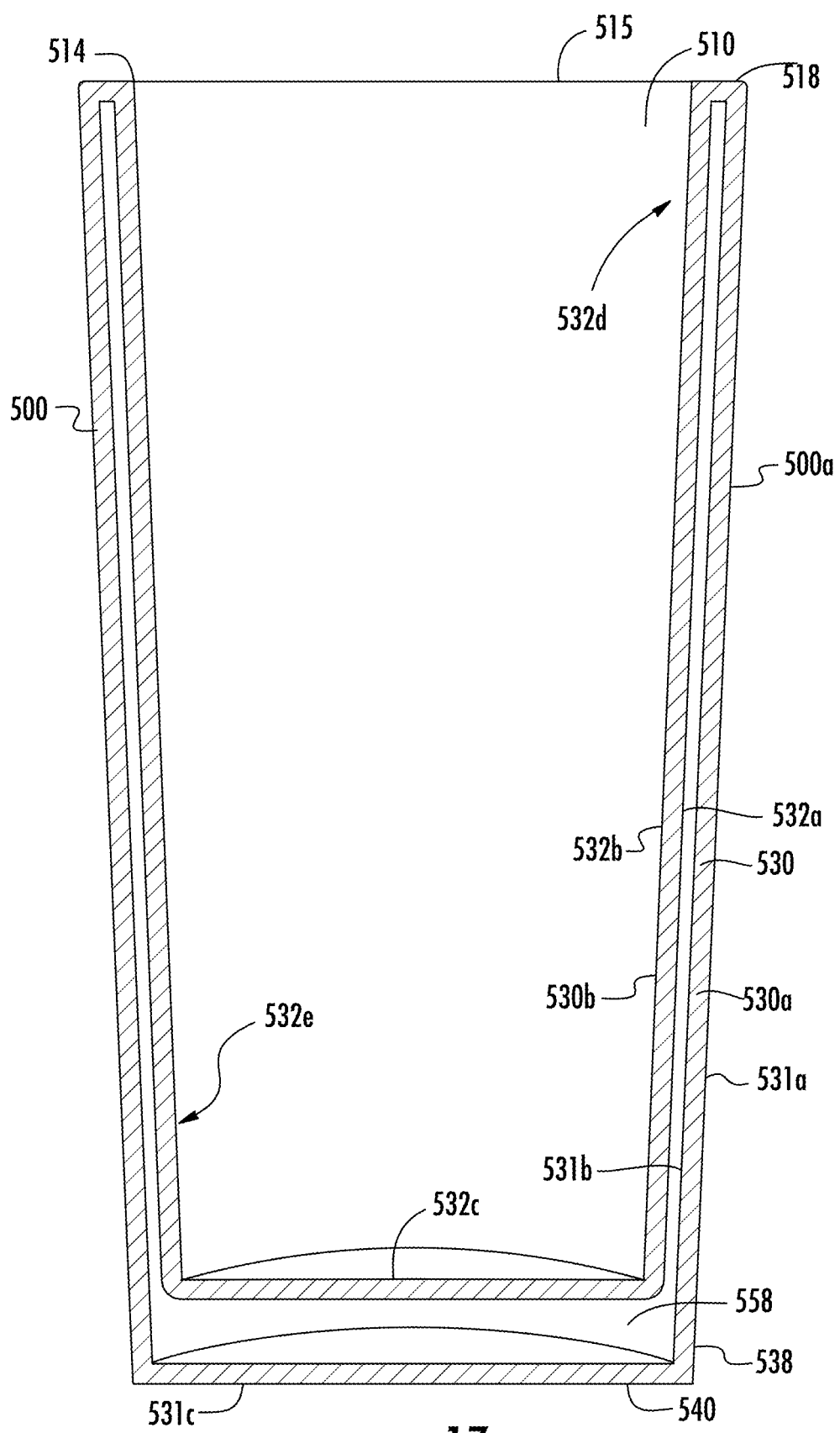
FIG. 17 is an elevated cross-section view of a vessel having a double wall configuration according to various embodiments described herein.
Figure 18:
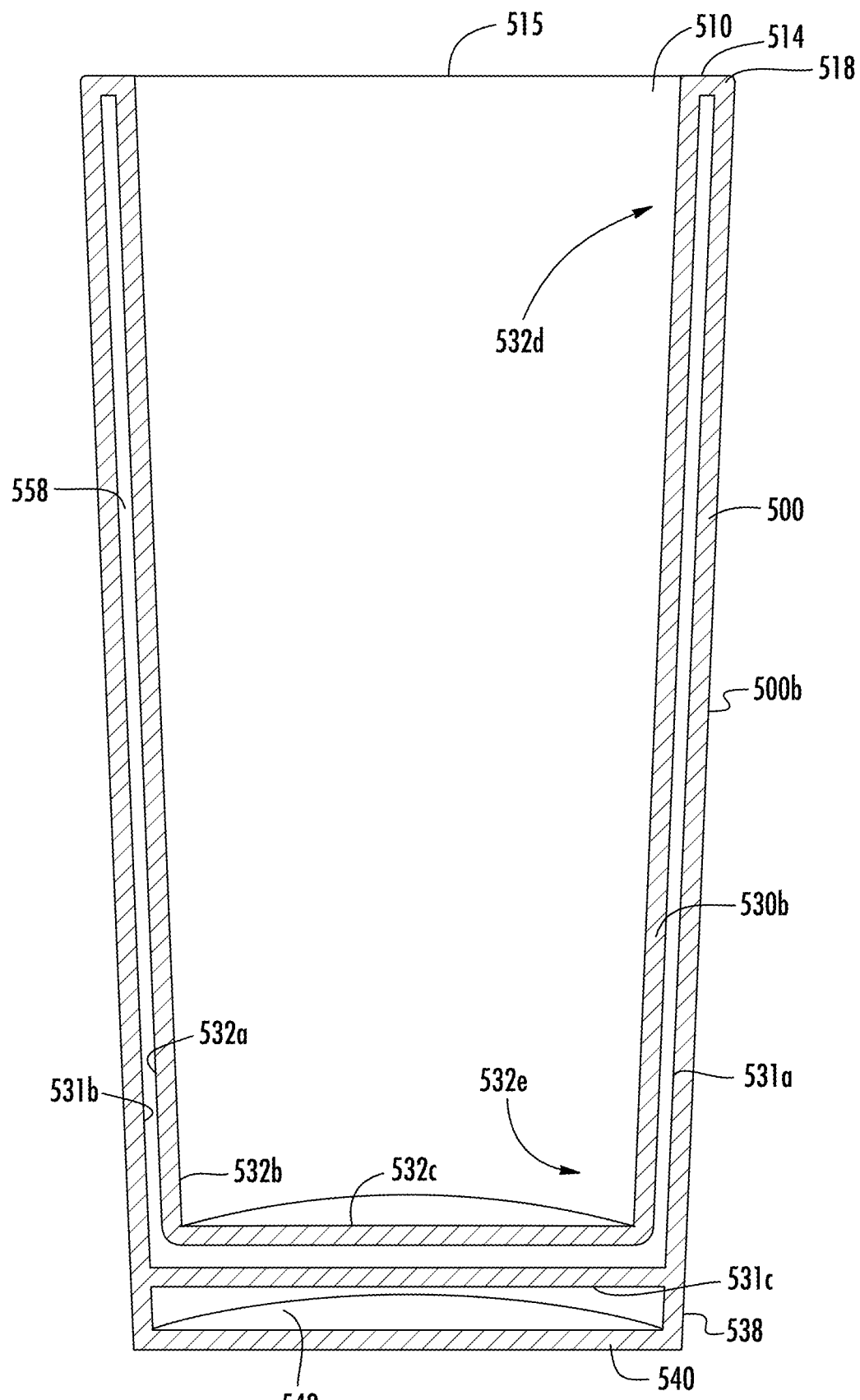
FIG. 18 is an elevated cross-section view of a vessel having a double wall configuration according to various embodiments described herein.
Figure 19:
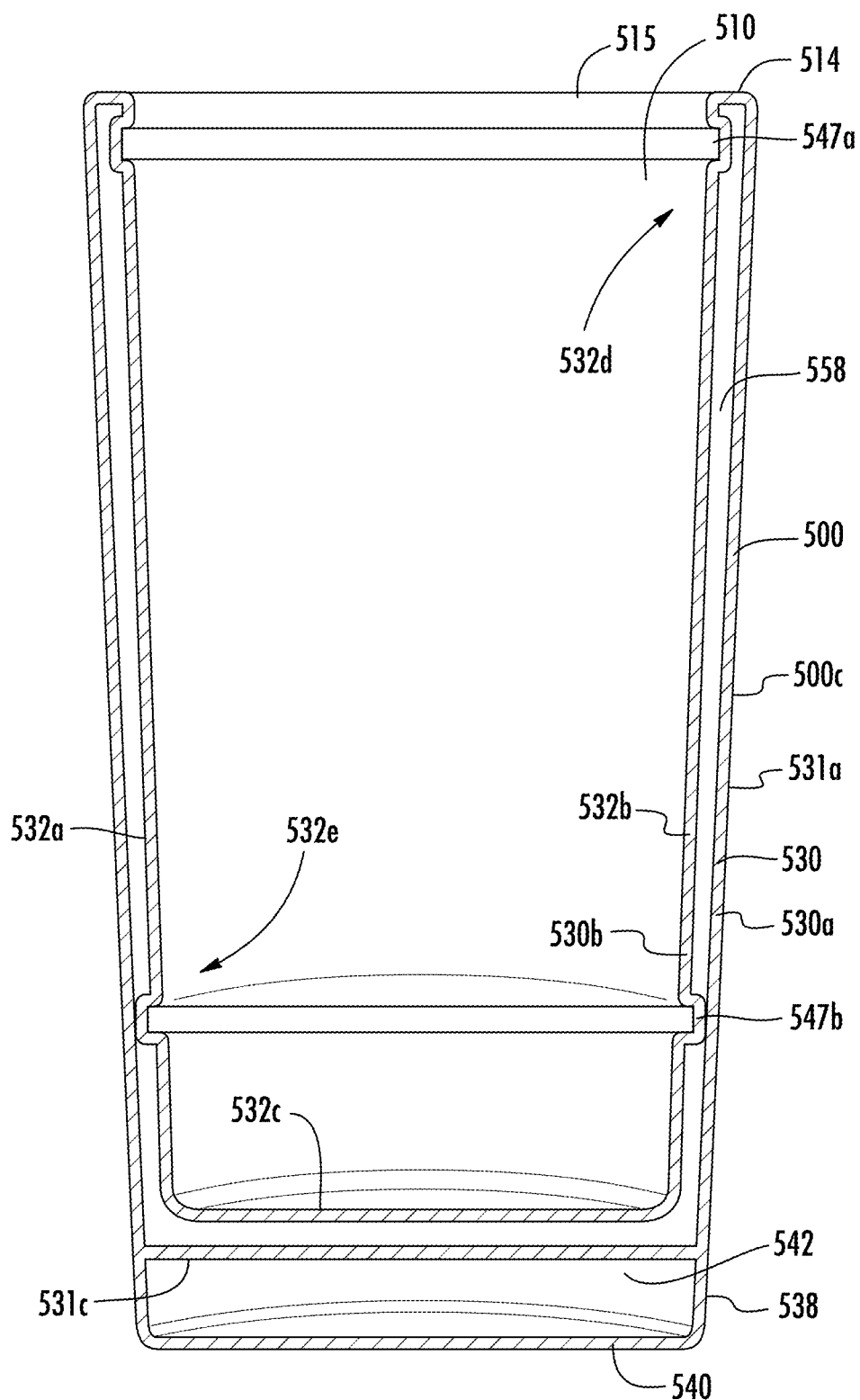
FIG. 19 is an elevated cross-section view of a vessel having a double wall configuration according to various embodiments described herein.

The modular beverage container system 3 includes a vessel 400 and a shell 500, wherein the vessel 400 is received within the shell 500. With further reference to FIGS. 17-19, the shell 500 may include one or more walls 530 and define an interior volume 510 dimensioned to removably receive the vessel 400 therein, wherein at least a portion of the interior volume 510 is insulated. The shell 500 further includes an upper rim 514 defining an opening 515 into the interior volume 510. In the illustrated embodiment, the shell 500 comprises a multiwall configuration to provide insulating functions with respect to the vessel 400. The double wall configuration may include an outer wall 530a and an inner wall 530b.

The outer wall 530a and inner wall 530b are spaced apart to define an insulation space 558 there between for insulation. In some embodiments, the insulation space 558 may be sealed for maintenance of a vacuum pressure within all or a portion of the insulation space 558. The shell 500 may also comprise a rigid, durable construction to protect the vessel 400 from external forces and/or damage.

Figure 16:
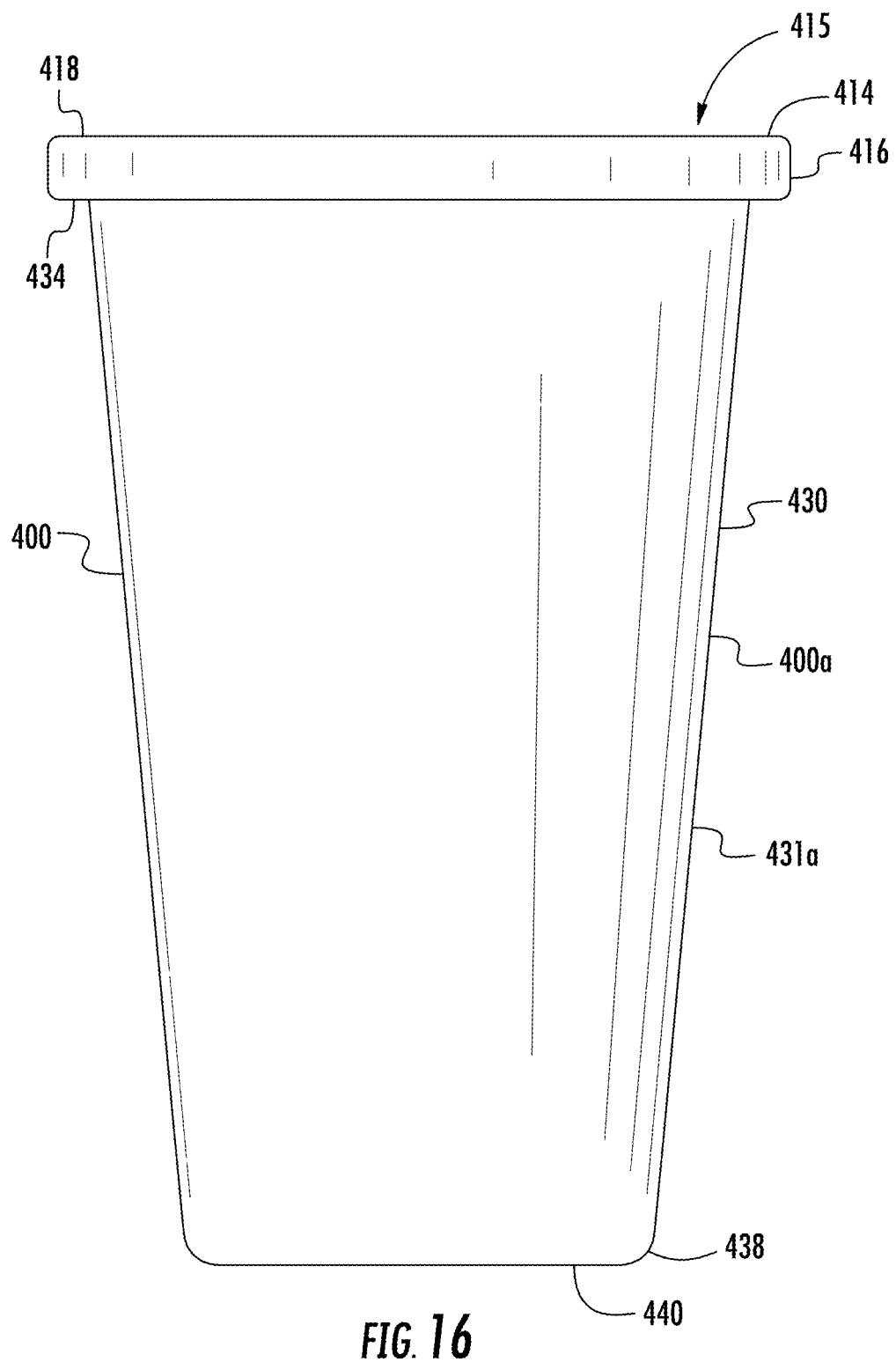
FIG. 16 is an elevated view of a vessel according to various embodiments described herein.
Figure 20:
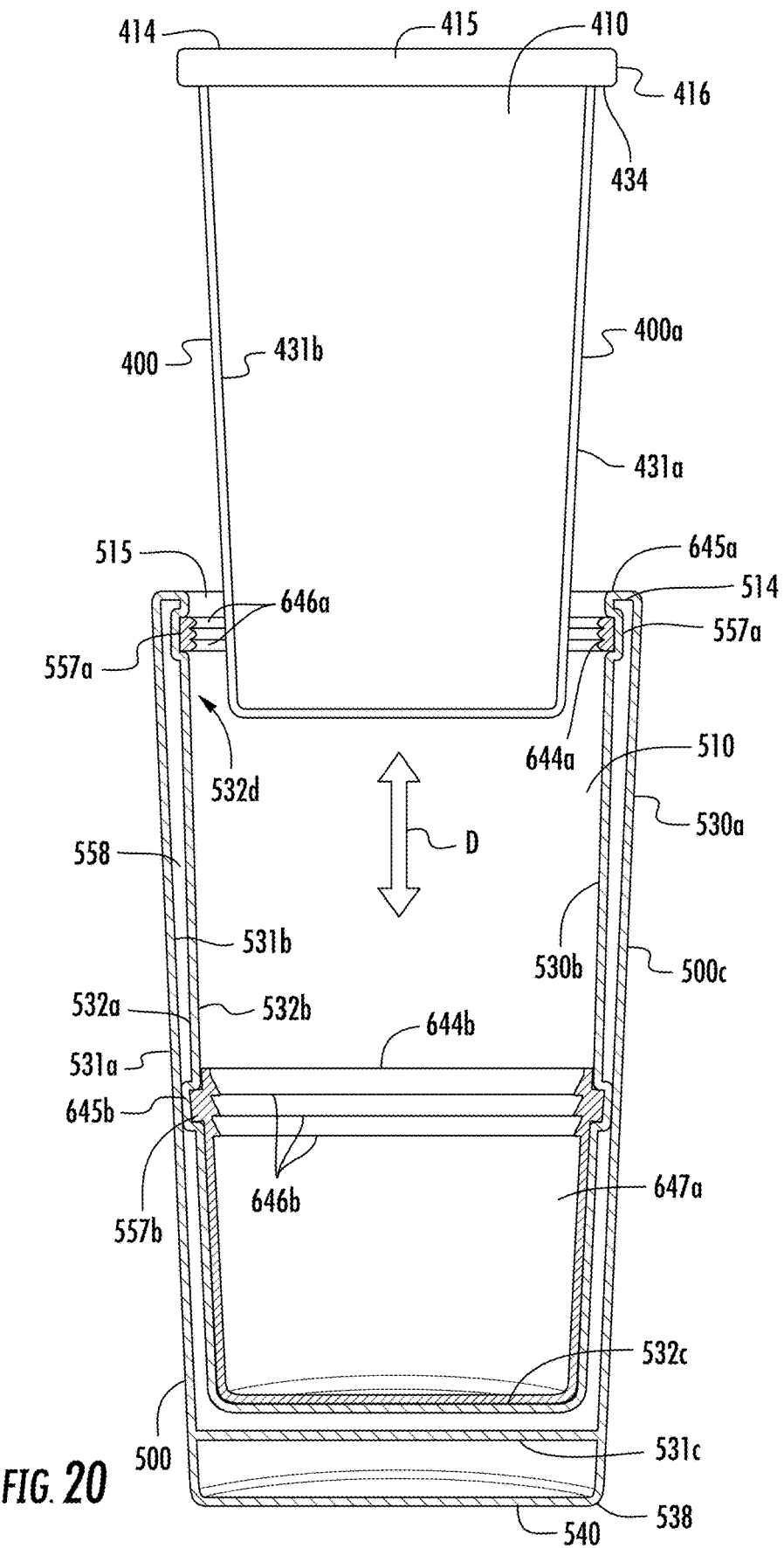
FIG. 20 is an elevated cross-section view of an assembly/disassembly of a shell and vessel of a modular beverage container system according to various embodiments described herein.

With further reference to FIG. 16 and FIG. 20, illustrating an embodiment of the vessel 400, which is specifically identified as vessel 400a, the vessel 400 defines an interior volume 410 configured to hold a liquid. The vessel 400 may further include an upper rim 414 defining an opening 415 into the interior volume 410 of the vessel 400. The upper rim 414 extends around an upper perimeter of the vessel 400a and includes an upper surface 418, upper sidewall 416 that extends around an outer perimeter of the upper rim 414, and 434 lip. A wall 430 extends from the upper rim 414 to a lower rim 438 and includes an outer sidewall 431a and an inner sidewall (see, e.g., inner sidewall 431b in FIG. 20) The lower rim 438 may form a perimeter of a base 440 of the vessel 400. The lip 434 projects outwardly beyond an adjacent lower portion of the wall 430.

In various embodiments, the vessel 400 may comprise glass, such as a silicate glass. In one embodiment, the vessel 400 comprises a borosilicate glass. While the properties of glass may offer a preferred balance of characteristics, particularly when protected by a durable, rigid shell 500, in some embodiments, the vessel 400 may be constructed from other materials, either together with or instead of glass. For example, in one embodiment, the vessel 400 comprises one or more of a ceramic, non-metallic ceramic, glass-ceramic, polymer, plastic, silicone, thermoplastic, polymer glass such as a polycarbonate, acrylic, or polyethylene terephthalate, metal, metallic, such as steel or stainless steel, rock, artificial stone, or combination or composite thereof. The modular beverage container system 3 is typically sized for personal use or to hold a common volume of liquid for a personal beverage container such as 12 oz., 20 oz., 32 oz., or 40 oz., for example. However, the vessel 400 and shell 500 are not limited to such sizes. The base 440 may comprise the same material as the wall 430 and lower rim 438 and be continuous therewith. In another example, the vessel 400 includes a base 440 that is attached to the lower rim 438, e.g., by adhesive or may be over-molded with a portion of the lower rim 438 and/or a sub-base extending across the cross-section defined by the lower rim 438.

In the embodiment shown in FIG. 15, the upper rim 414 of the vessel 400 positions above an upper rim 514 of the shell 500, exposing a sidewall 416 of the upper rim 414 along an upper end 6 of the modular beverage container system 3 when in an assembled configuration wherein the vessel 400 is received within the interior volume 510 of the shell 500, thereby removably coupling the same. However, in other embodiments, the sidewall 416 may not be exposed when the modular beverage container system 3 is in an assembled configuration. In one such example, the vessel 400 does not include a lip 434. In some embodiments, the upper rim 414 of the vessel 400 may extend level with or below the upper rim 514 of the shell 500.

The modular beverage container system 3 is further shown with lid 300, which may be as described above (see, e.g., FIG. 6), although other lid configurations may be used, such as lid 300a (see, e.g., FIGS. 12A & 12B). The lid 300 is configured to be modular with respect to the vessel 400 and shell 500 and to be removably coupled over the interior volume 410 of the vessel 400. In the embodiment shown in FIG. 15, the lid 300 positions within the upper rim 414 of the vessel 400, relatively flush with an upper surface 418 thereof. Other lid configurations may also be used, such as those described elsewhere herein, and may include lid configurations wherein the lid also removably couples over the interior volume 510 of the shell 500. For example, in some embodiments, the system 3 may include or removably couple with a lid configured to extend over the upper rim 414 of the vessel 400 and/or the upper rim 514 of the shell 500, or upper surfaces 418, 518 thereof, when the modular beverage container system 3 is in an assembled configuration. In some examples, the lid 300 may position above or below the upper rim 414 of the vessel 400 when removably coupled over the interior volume 410 of the vessel 400. In some embodiments, the system 3 may include and/or removably couple to a lid (not shown) that extends around the upper rim 414 of the vessel 400 and/or the upper rim 514 of the shell 500 when the modular beverage container system 3 is in an assembled configuration.

The modular beverage container system 3 depicted in FIG. 15 has a generally cylindrical profile shape that tapers from the upper end 6 toward a lower end 8. The modular beverage container system 3 also includes an annular horizontal cross-section shape having an increasing diameter from the lower end 8 to the upper end 6. In other embodiments, the modular beverage container system 3, e.g., vessel 400, shell 500, lid 300, or a combination thereof includes other profiles and/or cross-section shapes. For example, the modular beverage container system 3 may have a profile shape including straight or curved sides. Curves, for example, may curve outward from the lower end 8 toward the upper end 6. In some examples, the profile shape may taper at one or more points from the upper end 6 to the lower end 8. In various embodiments, the profile shape may include multiple tapered regions that taper at the same or different rates or degrees. In another example, the modular beverage container system 3 may have a profile shape that includes straight sides without tapering. Various embodiments of the modular beverage container system 3 may also include cross-section shapes such as annular or multisided geometric or non-geometric shapes.

With reference again to FIGS. 17-19 the outer wall 530a extends between an upper rim 514 and a lower rim 538. A base 540 may form a bottom end of the modular beverage container system 3 and/or shell 500 and may include and/or extend between or from the lower rim 538. The outer wall 530a may extend to the lower rim 538, which may include the base 540. In some embodiments, the lower rim 538 comprises an extension of the outer wall 530a to which the base 540 extends. The outer wall 530a includes an inner sidewall 531b and an outer sidewall 531a. In some embodiments, the outer sidewall 531a forms an exterior surface of the shell 500, which may be used by a user to grip or hold the shell 500 or modular beverage container system 3. The outer sidewall 531a extends between the upper rim 514 and the lower rim 538.

The inner wall 530b defines at least a portion of the interior volume 510 of the shell 500 and includes an outer sidewall 532a and an inner sidewall 532b. The inner sidewall 532b may define at least a portion of the interior volume 510 dimensioned to removably receive the vessel 400 in a manner similar to that described elsewhere herein with respect to other embodiments. The inner sidewall 532b extends from the upper rim 514 and includes an upper sidewall portion 532d, lower sidewall portion 532e, and a bottom portion 532c.

The insulation space 558 may be utilized to limit or prevent conduction or heat transfer between the walls 530a, 530b. For example, insulation may be positioned within the insulation space 558 between the walls 530a, 530b to provide thermal insulation with respect to the interior volume 510. For example, insulating materials such as plastics, foam, cellulose, glass, ceramics, or stone, may be used. In the illustrated embodiment, at least a portion of the insulation space 558 between the outer and inner walls 530a, 530b is sealed; thereby comprising a sealed volume 558a. Specifically, the outer sidewall 532a of the inner wall 530b and the inner sidewall 532b of the outer wall 530a are spaced apart and define a sealed volume 558a therebetween. As shown, the shell 500 comprises a vacuum insulation configuration wherein the sealed volume 558a is maintained at a vacuum pressure. The sealed volume 558a will typically include a single sealed volume; however, in some embodiments, the sealed volume 558a may include multiple sealed volumes. Similarly, it is preferable that insulation extend around as much of the interior volume 510 of the shell 500 as possible to provide a greater insulating area with respect to the outer sidewall 431a of the vessel 400 when received within the interior volume 510 of the shell 500. Thus, insulation is preferably provided along all or a majority, e.g., about 99%, about 95%, about 90%, about 85%, or greater than about 50%, of area of the inner sidewall 532b corresponding to the outer sidewall 431a of the vessel 400 when received within the interior volume 510. Multiple insulation configurations may also be used including areas of less or no insulation. For example, vacuum insulation may be used along a first portion of the interior volume 510 while an insulation material, e.g., a polystyrene foam, may be used along a second portion. In various embodiments, insulation material need not all be housing in volume. In one example, insulation material forms at least a portion of the outer sidewall 531a of the outer wall 530a.

The shell 500 preferably comprises a durable material, which may also be rigid, suitable to protect the vessel 400 when received within the interior volume 510 of the shell 500. In various embodiments, the shell may comprise s one or more of a ceramic, non-metallic ceramic, glass-ceramic, polymer, plastic, silicone, thermoplastic, polymer glass such as a polycarbonate, acrylic, or polyethylene terephthalate, metal or metallic, such as steel, stainless steel, or aluminum, rock, artificial stone, or combination or composite thereof. In one example, the shell 500 is constructed from stainless steel.

In various embodiments, the outer sidewall 531a may be modified to provide an improved grip or different aesthetics. In one configuration, the outer sidewall 531a may be coated or covered with another material. For example, the outer sidewall 531a may be coated or layered with a textured or resiliently compressible material to provide an improved grip.

As introduced above, the shell 500 may include a base 540. The base 540 may be continuous with outer sidewall 531a or may comprise a different material or structure. In some embodiments, the base 540 may include a coating or outer skin along outer sidewall 531a. The coating or outer skin may include a silicone or an elastomer for example. The coating or outer skin may assist a user in gripping the shell 500, e.g., the coating or outer skin may be textured, compressible, or ergonomically dimensioned to aid in grip. In one example, the shell 500 includes a handle extending from the outer wall 530a.

The base 540 may include or couple with the lower rim 538. In the embodiment illustrated in FIG. 17, the bottom portion 531c of the outer sidewall 531a of the shell 500a extends between the lower rim 538, under the lower sidewall portion 532e of the inner wall 530b, and forms a portion of the base 540. The base 540 may comprise the same material as outer wall 530a or may be constructed from a different material. For example, in one embodiment, the base 540 may comprise the same material as the outer sidewall 531a and the lower rim 538 and be continuous therewith. In another example, the base 540 may be attached to the lower rim 538 and/or bottom portion 531c of the outer sidewall 531a by adhesive (see, e.g., FIG. 23) or may be over-molded with a portion of the lower rim 538 and/or a sub-base extending across the cross-section defined by the lower rim 538. In one example, the base 540 comprises an elastomeric material comprising a silicone over molded with respect to the lower rim 538 and/or bottom portion 531c of the outer sidewall 531a. In some embodiments, the material is textured to allow displacement of liquid between textured grooves or indentations.

Figure 23:
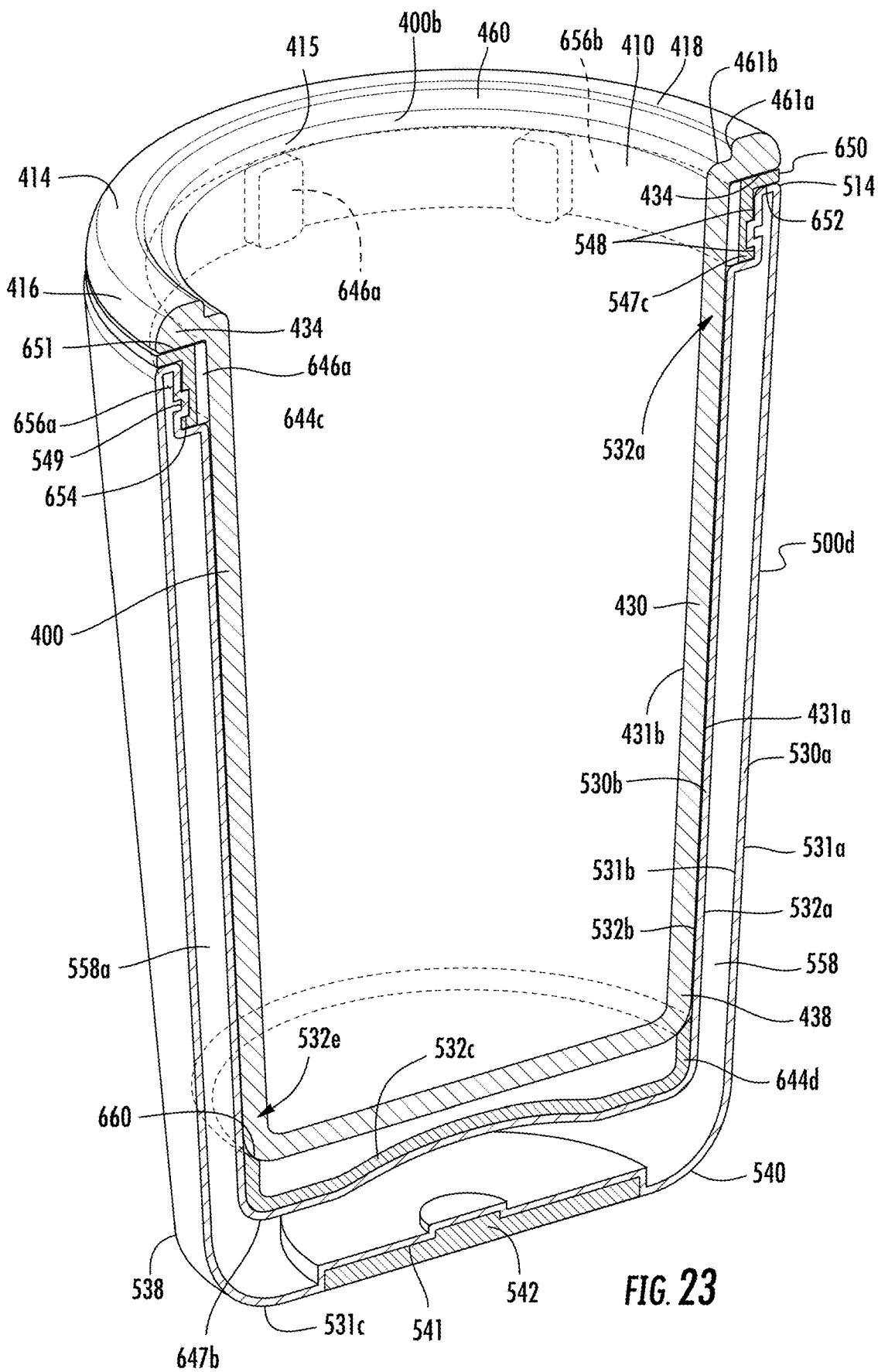
FIG. 23 is an elevated cross-section view in perspective of a modular beverage container system in an assembled configuration according to various embodiments described herein.

The shell 500b illustrated in FIG. 18 and the shell 500c illustrated in FIG. 19 differ from shell 500a in that shell 500b and shell 500c include a base cavity 541 positioned below the bottom portion 531c of the outer sidewall 531a, between the lower rim 514. In some embodiments, the base cavity 541 may be fitted for a reduced slip base material to provide increased friction between the base 540 and a surface onto which the shell 500 is placed. The base 540 may include or couple to or between the lower rim 538, which may also comprise an extension of the outer wall 530a or be attached thereto. The base 540 may further comprise material positioned within the base cavity 541, which may include an expanse of material that extends across the base cavity 541 from edges of the lower rim 538. The material may comprise a same or different material as outer wall 530a. In one example, the base 540 comprises the same material as the outer wall 540 and includes an additional material adhered thereto to interface with an adjacent surface the shell 500 is placed. In one embodiment, the base 540 illustrated in FIG. 18 or FIG. 19 includes a resiliently compressible material, silicone, polymer, or elastomeric material. In one embodiment, the base 540 includes a material configured to provide increased friction relative to the outer sidewall 531a material and may extend within or over the base cavity 541, between the lower rim 538. For example, the base 540 illustrated in FIG. 18 or FIG. 19 may comprise an increased friction material. In one embodiment, an increased friction material may be adhered to or otherwise coupled along the base 540 in the embodiments illustrated in FIGS. 17-19. In some embodiments, the base 540 includes a base cavity 541 into which material, such as increased friction base material, may be adhered or otherwise coupled. For example, the shell 500d illustrated in FIG. 23 depicts another embodiment of a base cavity 541 dimensioned to house a base material 542 between the lower rim 538 wherein the base cavity 541 is positioned in the bottom portion 532c of the outer sidewall 531a and protrudes inwardly into insulation space 558, which may be a sealed volume 558a. The base material 542 fills a majority of the volume of the cavity 541. It is to be appreciated that increased friction material may be provided by a material or base material 542 itself and/or surface contours, e.g., indentations or groves, in the material. In some embodiments, the base 540, which may include a base material 542, includes one or more pores or concave portions configured to provide suction between the base 540 and an adjacent surface the shell 500 is positioned.

The vessel 400 and shell 500 are configured such that the vessel 400 removably couples within the interior volume 510 of the shell. The shell 500, vessel 400, and/or other structure may comprise one or more fittings configured to removably couple the shell 500 and vessel 400. Fittings may include configurations of the shell 500, vessel 400, lid 300, and/or associated material, e.g., structures. Fittings may include fitting or coupling configuration described above with respect to system 2 or elsewhere herein. For example, fittings may include configurations utilizing actuators, pistons, diaphragms, hook and loop, vacuum, snap fit, press/interference fit, or other suitable fitment configuration. In one example, fittings may comprise threads configured to threadably engage to thereby removably couple the vessel 400 and the shell 500. For example, the outer sidewall 431a of the vessel 400 may include threads positioned to threadably engage corresponding threads positioned along the inner sidewall 532b of the shell 500. In another example, a threaded projection may extend the bottom portion of the inner sidewall of the shell or the base of the shell for threadably coupling with a respective corresponding threaded hole in the base of the shell or inner sidewall of the shell. In one configuration, a lid may include a fitting comprising threads that may be threaded onto corresponding fitting comprising threads located along the outer sidewall 531a of outer wall 530a to retain and thereby removably couple the vessel 400 within the interior volume 510 of the shell 500.

In various embodiments, the shell 500 and vessel 400 are configured such that the vessel 400 may be pressed or compressed within the interior volume 510 of the shell 500 to provide a press fit. For example, the interior volume 510 of the shell 500 may define a cross-section dimension along the inner sidewall 532b that is less than a corresponding cross-section dimension defined by the outer sidewall 431a of the vessel 400. With respect to cross-section dimensions defined by the outer sidewall 431 and/or inner sidewall 532b, the cross-section dimensions may be defined by the outer sidewall 431a, inner sidewall 532b, and/or a material, which may comprise a structure, associated with the outer sidewall 431a or inner sidewall 532b. The outer sidewall 431a, inner sidewall 532b, and/or associated material defining the corresponding cross-section dimensions may be referred to herein as a fitting.

In various embodiments wherein the modular beverage container system 3 comprises a fitting configured for press fitment, at least one of a hole or a projection includes a resiliently compressible and/or elastomeric material that may be resiliently compressed or stretched to thereafter provide a friction fit with respect to the other. In one embodiment, the vessel 400 includes a fitting comprising a hole defined in the base 440 and the shell 500 includes a projection along the bottom portion 532c of the inner sidewall 532b, which may include an associated portion thereof, similar to that illustrated in FIG. 8. The base 440 and/or fitting portion thereof may comprise the same material as one or both of wall 430 or wall 530a or may be constructed of a different material.

In one embodiment, the inner sidewall 532b of the shell 500 includes a fitting comprising a resiliently compressible material defining a reduced cross-section dimension with respect to the corresponding cross-section dimension of the vessel 400 to provide a press fit. The compressible material may be coated or layered onto the inner sidewall 532b. In some embodiments, coating, layering, over-molding, adhesives, and/or complementary dimensions may be used to maintain the material along the inner sidewall 532b. In some embodiments, the outer sidewall 431a of the vessel 400 includes a fitting comprising a resiliently compressible material defining a larger cross-section with respect to the corresponding cross-section dimension of the interior volume 510 of the shell 500. The compressible material may be coated or layered onto the outer sidewall 431a. In some embodiments, coating, layering, over-molding, adhesives, and/or complementary dimensions may be used to maintain the material along the outer sidewall 431a. In one configuration, both the inner sidewall 532b and outer sidewall 431a may include fittings comprising resiliently compressible materials to provide a press fit. In some embodiments, the compressible material may comprise an elastomeric material. In one embodiment, the inner sidewall 532b comprises a metal defining a cross-section with respect to the interior volume 510 that is less than a corresponding cross-section of the vessel 400 wherein insertion of the vessel 400 into the interior volume 510 of the shell 500 causes interfacing surfaces along the cross-sections to engage and compress thereby increasing the cross-section defined by the inner sidewall 532b to provide a press fit. In one embodiment, a fitting may include a material inserted or insertable between the outer sidewall 431a and the inner sidewall 532b to compress therebetween and create a press fit.

As used herein, compressible and/or elastomeric materials include resilient materials such that upon removal of compression, the material returns to pre-compressed dimensions. In one example, one or more compressible or elastomeric structures are associated with the outer sidewall 431a of the vessel 400 and/or inner sidewall 532b of the shell 500 such that when the structures are positioned between the corresponding cross-section dimensions of the vessel 400 and shell 500 when inserted, wherein the material creates increased friction between the corresponding dimensions to provide a press fit.

As introduced above, the inner wall 530b of the shell 500 includes an inner sidewall 532b including an upper end 532d, a lower sidewall portion 532e, and a bottom portion 532c. In various embodiments, fittings may be positioned along any portion of the inner sidewall 532b and/or outer sidewall 431a of the wall 430 of the vessel 400. The upper sidewall portion 532d, lower sidewall portion 532e, and/or bottom portion 532c may comprise a same material or different material. In one example, such fittings comprise a resiliently compressible material configured to compress between corresponding cross-sections to provide a press fit. In one embodiment, the lower sidewall portion 532e includes or is associated with a structure configured to assist in a press fit with a corresponding dimension of the vessel 400. For example, the lower sidewall portion 532e may include or associate with a structure comprising a fitting. When positioned between the inner sidewall 532b of the shell 500 and the outer sidewall 431a of the vessel 400, the fitting may reduce a cross-section dimension therealong to provide a press fit. For example, the fitting together with the inner sidewall 532b may define a cross-section dimension smaller than a corresponding cross-section dimension of the vessel 400 defined by the outer sidewall 431a to provide a press fit. Similarly, the fitting together with the outer sidewall 431a may define a cross-section dimension larger than a corresponding cross-section dimension of the interior volume 510 of the shell 500. While fittings are generally described and illustrated herein as being associated with the shell 500, it is to be appreciated that additionally or alternatively similar fittings may be associated with the vessel 400.

As noted above, fittings may include material associated with the inner sidewall 532b of the inner wall 530b of the shell 500 and/or outer sidewall 431a of wall 430 of the vessel 400. Such material may be associated with the inner sidewall 532b or outer sidewall 431a by coating, layering, over-molding, adhesives, and/or complementary dimensions may be used to maintain the material therealong. The shell 500c illustrated in FIG. 19 provides an example of a shell 500 including one or more fitting receptacles 547a, 547b for seating a fitting along the inner sidewall 532b defining the interior volume 510 of the shell 500. The fitting receptacles 557a, 547b include grooves for receiving a seating projection of fitting to assist in maintaining the location of the fitting during assembly and disassembly. Fitting receptacle 557a extends along the upper sidewall portion 532d of the inner sidewall 532b and fitting receptacle 557b extends along the lower sidewall portion 532*e* of the inner sidewall 532*b*. In other embodiments, fewer or additional fitting receptacles 557*a*, 557*b* may be included. In various embodiments, fitting receptacles 557*a*, 557*b* may include additional grooves. In some embodiments, fitting receptacles 557*a*, 557*b* may comprise one or more projections for extending into a groove of a fitting or for abutting an upper or lower side surface of a fitting. For example, in one embodiment, a first projection and a second projection may extend from the inner sidewall 532*b*, wherein the first projection is positioned above the second projection. A fitting or portion thereof may be positioned between the projections such that the projections abut upper and lower sides of the fitting to assist in maintaining the location of the fitting during assembly and disassembly. Fittings may also be attached to the inner sidewall 532*b*, which may include within the fitting receptacles 557*a*, 557*b*, e.g., with adhesive.

As noted above, the insulation space 558 between walls 530*a*, 530*b* will typically include a single sealed volume 558*a*; however, in some embodiments, the insulation space 558 may include multiple sealed volumes 558*a*. Similarly, it is preferable that the insulation extend around as much of the vessel 400 as possible when coupled within the interior volume 510 of the shell 500 to provide greater insulating area with respect to the outer sidewall 431*a* of the vessel 400. However, it will be appreciated that multiple insulation configurations may be used including areas of less or no insulation. For example, vacuum insulation may be used along a first portion of the interior volume 510 while an insulation material, e.g., a polystyrene foam, may be used along a second portion. In one embodiment, the insulation material need not be housing in a sealed. In the illustrated embodiment, the sealed volume 558*a* extends around and above fitting receptacle 547*a* and around and below fitting receptacle 547*b*. In some embodiments, however, the sealed volume 558*a* may not extend around and/or above fitting receptacle 547*a* and/or around and/or below fitting receptacle 547*b*. In one example, the sealed volume 558*a* comprises a first sealed volume extending between the fitting receptacles 547*a*, 547*b*, a second sealed volume that extends above receptacle 547*a*, and a third sealed volume that extends below receptacle 547*b*. In another example, the first sealed volume extends below both receptacles 547*a*, 547*b* and the second sealed volume extends above receptacle 547*a*. In another embodiment, the first sealed volume extends above both receptacles 547*a*, 547*b* and the second sealed volume extends above receptacle 547*a*.

Figure 21:
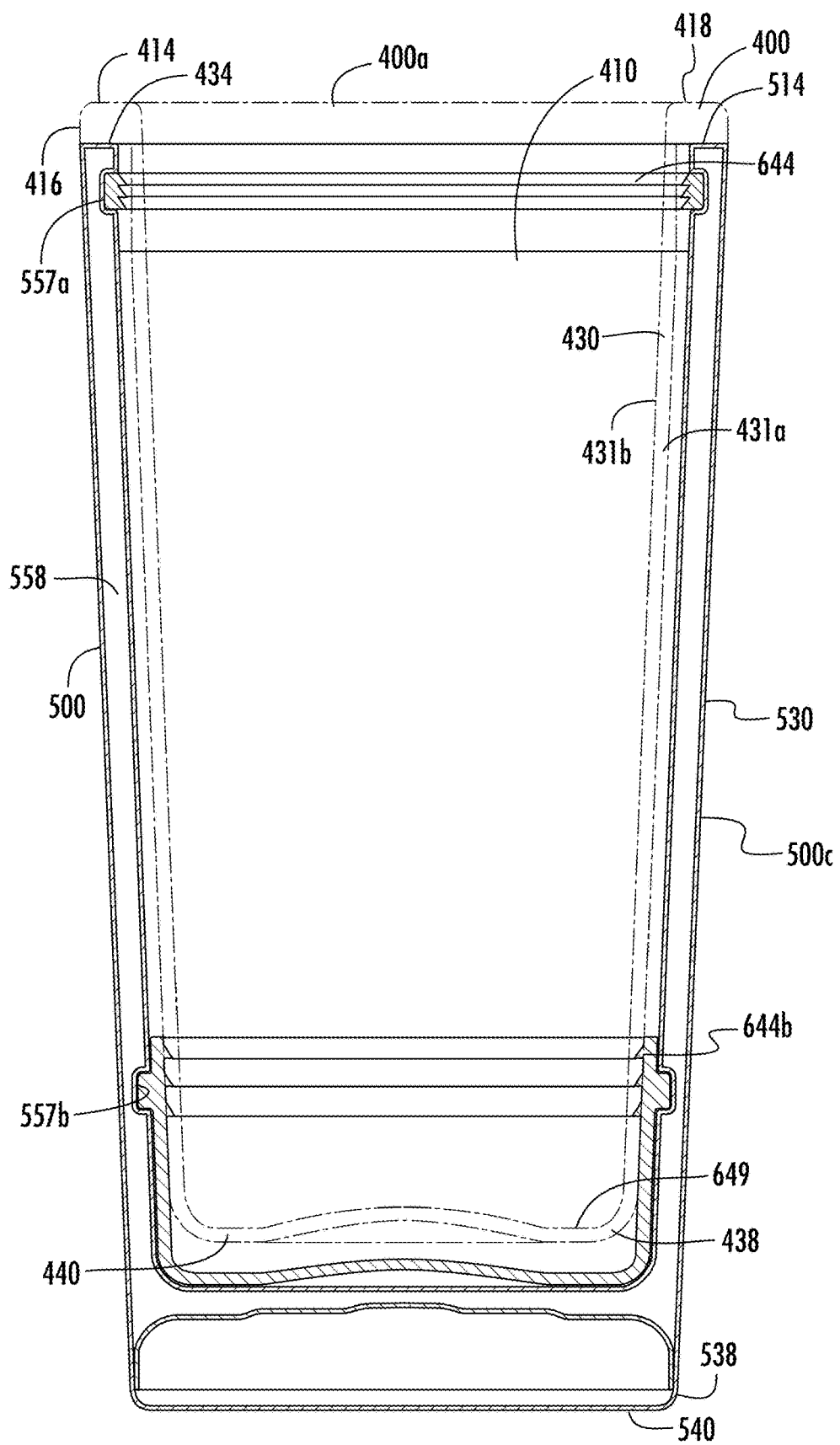
FIG. 21 is an elevated cross-section view of a modular beverage container system including the shell and vessel of FIG. 20 in an assembled configuration according to various embodiments described herein.
Figure 22:
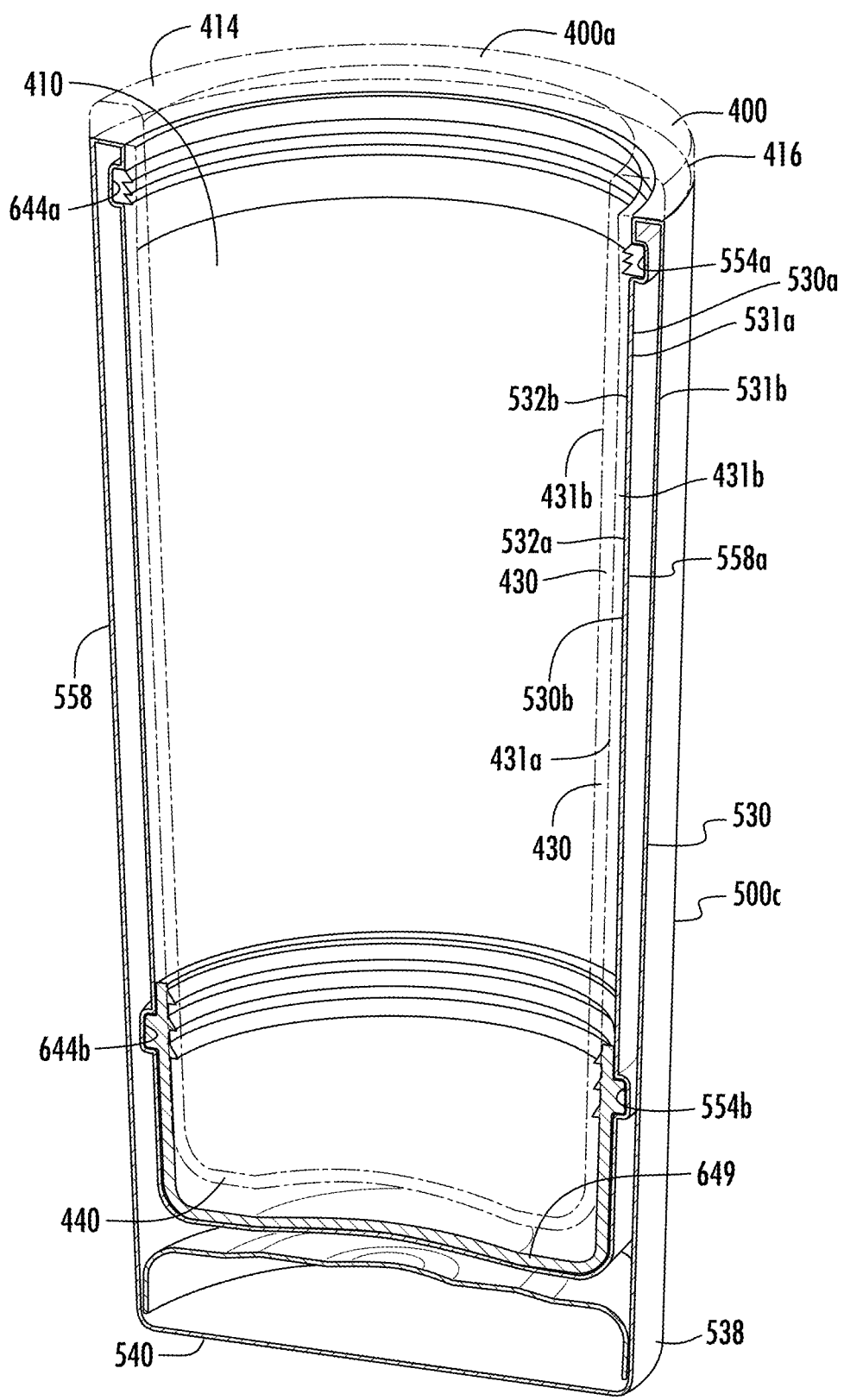
FIG. 22 is an cross-section view in perspective of a modular beverage container system including the shell and vessel of FIG. 20 in an assembled configuration according to various embodiments described herein.

FIG. 20 illustrates assembly or disassembly of embodiment of the modular beverage container system 3 including the shell 500*c* described with respect to FIG. 19 and a vessel as described with respect to FIG. 16. With further reference to FIGS. 21 & 22, illustrating views of the modular beverage container system 3 of FIG. 20 when assembled, the vessel 400 and shell 500 may be removably coupled by inserting the vessel 400 into the interior volume 510 of the shell 500 as indicated by the down arrow of double arrow D and decoupled by pulling the vessel 400 from the interior volume 510 of the shell 500 as indicated by the up arrow of double arrow D.

The shell 500 includes fittings 644*a*, 644*b* to assist in providing a press fit. In various embodiments, a fitting provides a reduced dimension along a perimeter of the interior volume 510 of the shell 500 with respect to a corresponding dimension of the vessel 400 to provide a press fit that removably couples the vessel 400 within the interior volume 510 of the shell 500. Fitting 644*a* is positioned along the upper sidewall portion 532*d* of the inner sidewall 532*b* and includes a seating projection 645*a* that extends into the groove of receptacle 547*a*. The seating projection 645*a* comprises upper and lower sides of the fitting 644*a*; however, in other embodiments, the upper and/or lower sides of the fitting 644 may be positioned above or below respective upper and lower sides of the groove of the fitting receptacle 547*a*. Fitting 644*b* is positioned along the lower sidewall portion 532*e* of the inner sidewall 532*b* and includes a seating projection 645*b* that extends into the groove of receptacle 547*b*. Fitting 644*b* also includes a cup portion 649 that extends along the lower sidewall portion 532*e* and bottom portion 532*c* of the inner sidewall 532*b*. As noted above, the fittings 644*a*, 644*b* may be attached along the inner sidewall 532*b*, which may include within receptacles 547*a*, 547*b*, by adhesives or other suitable manner. In one embodiment, seating projections 645*a*, 645*b* comprise rigid materials that firmly position in the receptacles 547*a*, 547*b* without adhesives.

Fitting 644*a* includes one or more annular projections 645*a* that extend inwardly, into the interior volume 510 to define a cross-section having a reduce dimension with respect to a corresponding cross-section dimension of the vessel 400. The one or more projections 645*a* may comprise a resiliently compressible and/or elastomeric material such as silicone configured to compress against the outer sidewall 431*a* of the vessel to provide a press fit, which may also be referred to as an interference or friction fit. Additionally or alternatively, the one or more projections 645*a* may extend from a resiliently compressible and/or elastomeric backing such that the one or more projections 645*a* may be compressed against the outer sidewall 431*a* of the vessel for assembly and thereafter apply friction against the same to provide a press fit. In some embodiments, greater or fewer projections 645*a* projections may be used. In some embodiments, projections 645*a* may also be integral with respect to the inner sidewall 532*b*.

Fitting 644*b* includes one or more annular projections 645*b* that extend inwardly, into the interior volume 510 to define a cross-section having a reduce dimension with respect to a corresponding cross-section dimension of the vessel 400. The one or more projections 645*b* may comprise a resiliently compressible and/or elastomeric material such as silicone configured to compress against the outer sidewall 431*a* of the vessel to provide a press fit. Additionally or alternatively, the one or more projections 645*b* may extend from a resiliently compressible and/or elastomeric backing such that the one or more projections 645*b* may be compressed against the outer sidewall 431*a* of the vessel for assembly and thereafter apply friction against the same to provide a press fit. In some embodiments, greater or fewer projections 645*b* projections may be used. In some embodiments, projections 645*b* may also be integral with respect to the inner sidewall 532*b*.

During assembly, projections 645*a*, 645*b* may engage corresponding cross-section dimensions of the vessel 400 along the outer sidewall 431*a*. The fittings 645*a*, 645*b* and sidewalls 431*a*, 532*b* may be dimensioned such that an upper surface of the upper rim 514 of the shell 500 engages the lip 434 of the upper rim 414 of the vessel 400 when a suitable press fit has been achieved. As described above and elsewhere herein, in some examples, the upper rim 414 of the vessel 400 may not include a lip 434 and the upper rim 414 may position above, approximately flush with, or below an upper surface of the upper rim 514 of the shell 500 in an assembled configuration. In some such embodiments, the upper rim 414, e.g., upper surface 418 and/or sidewall 416, may be contoured to provide better grip for assembly/ disassembly. In this or another example, the upper rim 414 of the vessel 400 may extend outwardly beyond the upper rim 514 of the shell 500 when the vessel 400 and shell 500 are removably coupled in an assembled configuration.

Increased or decreased air pressure between the vessel 400 and shell 500 may interfere with ease of assembly or disassembly when coupling or uncoupling the vessel 400 and the shell 500. In some embodiments, the interior volume 510 may include one or more openings along the wall 530 or base 540 for the passage of atmosphere during coupling or uncoupling of the vessel 400 from the interior volume 510 of the shell. For example, an opening may be provided through the walls 530a, 530b to allow atmosphere to move into or out of the interior volume 540 during assembly/disassembly. In some embodiments, an opening may be selectively opened and closed, e.g., via removal of a plug or opening of a valve. In one embodiment, the inner sidewall 532b of the shell 500 and/or the outer sidewall 431a of the vessel 400 includes passages for the movement of atmosphere between the interior volume 510 of the shell 500 and the wall 430 of the vessel 400. For example, the inner sidewall 532b of the shell 500 and/or the outer sidewall 431a of the vessel 400 may include one or more vertically extending grooves through which air may enter during insertion of the vessel 400 and escape during removal of the vessel 400. Similarly, the corresponding cross-section dimensions of the interior volume 510 of the shell 500 and the exterior of the vessel 500 may be defined by projections extending from the inner sidewall 532b and/or outer sidewall 431a, which engage the corresponding surfaces of the vessel 400 or shell 500, as the case may be, when the vessel 400 is received within the interior volume 510. Vertically extending gaps between the projections may be provided for the passage of atmosphere.

Further to the above, in various embodiments, a fitting is provided between the vessel 400 and shell 500 that is configure to allow movement of atmosphere between the interior volume 510 of the shell 500 and the wall 430 of the vessel 400 during insertion and removal of the vessel 400. For example, a fitting may include air passages. Air passages may include holes, gaps, or grooves, for example. Fittings may also create air passages adjacent to projections when engaged with the outer sidewall 431a. In one embodiment, one or both of the fittings 644a, 644b shown in the embodiment illustrated in FIGS. 20-22 include one or more passages for atmosphere to pass during assembly, disassembly, or both. For instance, one or more vertically extending gaps may be provided between projections 646a, 646b.

FIG. 23 illustrates another embodiment of the modular beverage container system 3. The shell 500, specifically identified as shell 500d, is similar to the shells 500a, 500b, 500c described above with respect to FIGS. 17-22 where like features are identified by like numbers. Briefly, the outer wall 530a and inner wall 530b of the shell 500d together define an insulation space 558. As shown, the insulation space 558 comprises a sealed volume 558a for maintaining a vacuum pressure. As noted above, shell 500d includes a base cavity 541 dimensioned to house a base material 542 between the lower rim 538.

The vessel 400, indicated as vessel 400b, includes groove 460 defined along the upper rim 414 similar to that described with respect to vessel 400a shown FIGS. 11 & 14. Vessel 400b may be otherwise similar to vessel 400a described with respect to FIG. 16, wherein like features are identified by like numbers. The groove 460 includes an interior sidewall 461a that extends around an outer perimeter of the groove 460. The interior sidewall 461a extends generally vertically from a base 461b of the groove 460. The base 461b may extend generally horizontally with respect to the conventional orientation of the vessel 400b. The groove 460 forms an interiorly positioned recessed rim of the upper rim 414 and may be dimensioned to form a seat for a lip of a lid dimensioned to be received within the recessed groove 460, similar to that of lid 300a described with respect to FIGS. 12A & 12B. In one embodiment, lid 300a may removably couple within the vessel 400b in a manner similar to that described with respect to FIG. 14. As described above and elsewhere herein, in some examples, the upper rim 414 of the vessel 400 does not include a lip 134 and the upper rim 414 may position above, approximately flush with, or below an upper surface 518 of the upper rim 514 of the shell 500 in an assembled configuration. In some embodiments, the upper rim 414 of the vessel 400 may extend outwardly beyond the upper rim 514 of the shell 500 when the vessel 400 and shell 500 are removably coupled in an assembled configuration.

The modular beverage container system 3 illustrated in FIG. 23 includes a first fitting 644c positioned along an upper sidewall portion 532d of the inner sidewall 532b along a fitting receptacle 547c. The fitting receptacle 547c includes one or more grooves 548 that extend to the upper rim 514. The fitting receptacle 547c further includes a projection 549 that extends from the groove 548. In the illustrated embodiment, upper and lower sides of the groove 548, formed adjacent to respective upper and lower sides of the projection 549, have similar depth, but in other embodiments, the groove 548 may include different depths. Additionally, in some embodiments, additional grooves 548 and/or projections 549 may be provided. The upper side of the groove 548 extends to the upper rim 514; however, in other embodiments, the upper side of the groove 548 may not extend to the upper rim 514.

Figure 24A:
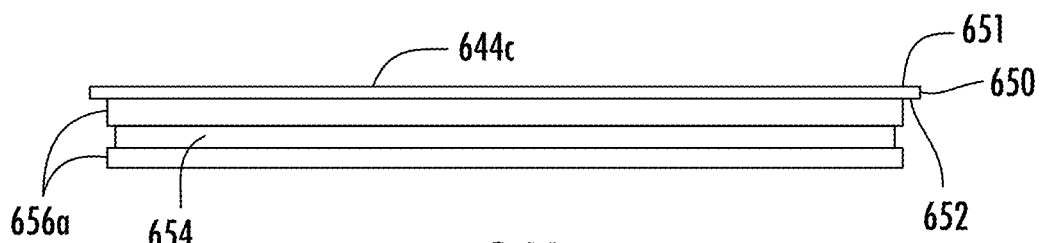
FIG. 24A is an isolated side view of the first fitting shown in FIG. 23 according to various embodiments described herein.
Figure 24B:
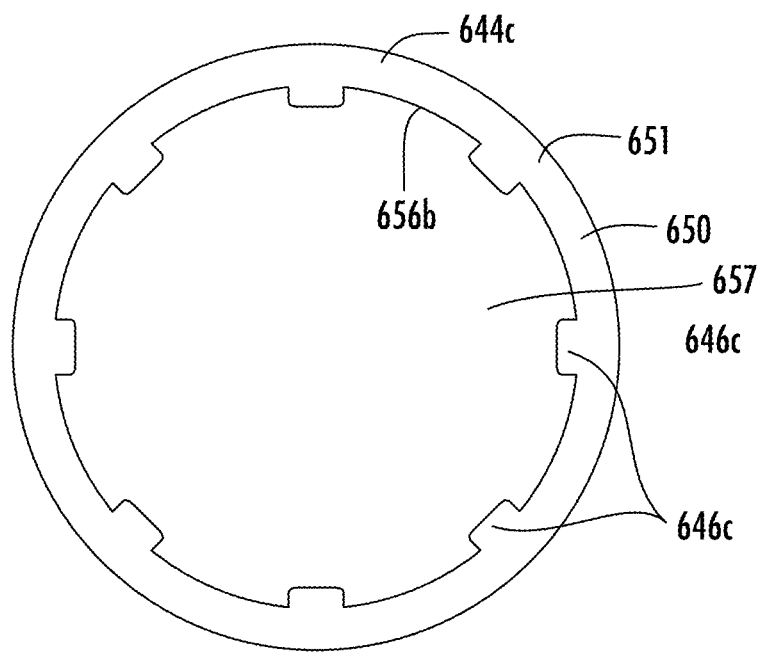
FIG. 24B is an isolated top view of the first fitting shown in FIG. 23 according to various embodiments described herein.
Figure 25A:
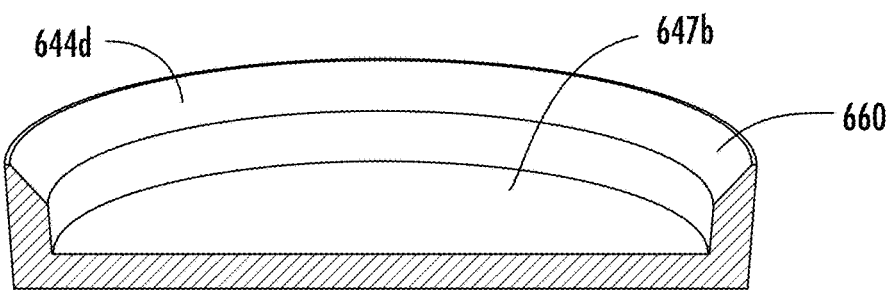
FIG. 25A is an isolated cross-section view of the second fitting shown in FIG. 23 according to various embodiments described herein.
Figure 25B:
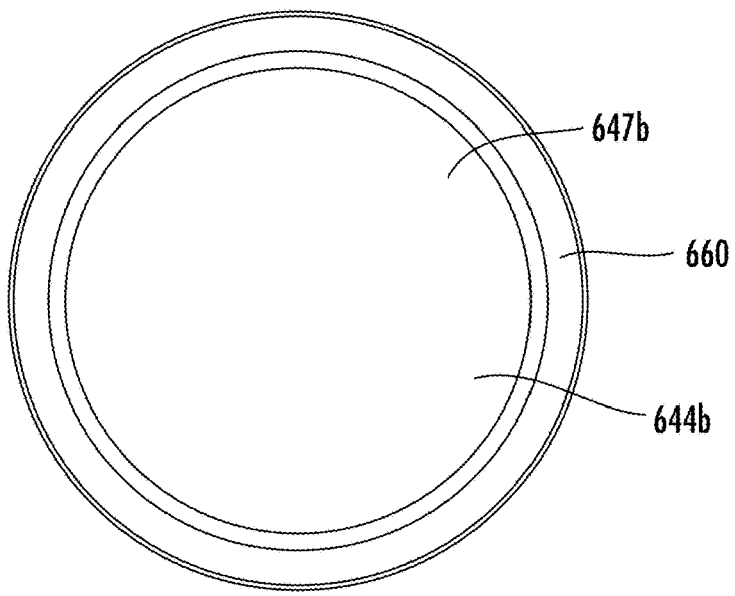
FIG. 25B is an isolated top view of the second fitting shown in FIG. 23 according to various embodiments described herein.

With further reference to the isolated views of fitting 644c in FIGS. 24A & 24B, the fitting 644c includes an annular ring comprising an outer sidewall 656a and an inner sidewall 656b. The outer sidewall 656a includes a groove 654 for receiving projection 549. A plurality of projections 646c extend from the outer sidewall 656a and are positioned to engage a corresponding portion of the outer sidewall 431a of the vessel 400a when the vessel 400a is coupled within the interior volume 510 of the shell 500d. The projections 646c may define a smaller cross-section dimension than the corresponding portion of the outer sidewall 431a of the vessel 400 to provide a press fit. In some embodiments, the projections 646c may comprise resiliently compressible material, high friction material, or both. In some embodiments, the outer sidewall 656a or underlying material may comprise resiliently compressible material. The projections 646c are spaced apart to provide gaps 657 for air passage. The fitting 644c also includes a flange 650. The flange 650 may include an upper surface 651 for interfacing with the lip 434 of the vessel 400 and a lower surface 652 for interfacing with the upper surface 518 of the upper rim 514. The flange 650 may comprises a resiliently compressible material to provide a protective cushion between the lip 434 and the upper rim 514. In some embodiments, fitting 644c may not include a flange 650. The fitting 644c may be attached along the upper sidewall portion 532d along sidewall 656, groove 654, lower surface 652, or combination thereof. Attachment may be via adhesives, for example.

The modular beverage container system 3 illustrated in FIG. 23 includes a second fitting 644d positioned along the lower sidewall portion 532e. With further reference to the isolated views provided in FIGS. 25A & 25B, the fitting 644*d* includes a tapered portion 660 that tapers inwardly to a decreased cross-section dimension. In the illustrated embodiment, the tapered portion 660 extends around the perimeter of the inner sidewall 532*b*; however, in some embodiments, the tapered portion 660 is discontinuous, e.g., vertically extending gaps may be positioned along the tapered portion 660. The inward taper eases initial lining up and pressing of the vessel 400 into the decreased dimension. In other embodiments, the vessel 400 may not press-fit with the tapered portion 660 but rather rest or position on the tapered portion 660 to assist in retaining the position of the vessel 400 with respect to the interior volume 510, e.g., to limit lateral movement of the vessel 400 within the shell 500. The fitting 644*d* also includes a cup portion 649 that extends over the bottom portion 532*c* of the inner sidewall 532*b*. The cup portion 649 may assist in providing stability with respect to the position of the fitting 664*d*. The fitting 644*d* may be attached along the upper sidewall portion 532*e*, bottom portion 532*c*, or both. Attachment may be via adhesives, for example. In some embodiments, the system 3 may include fewer or additional fittings 644*c*, 644*d*, such as any fitting described herein.

Figure 26:
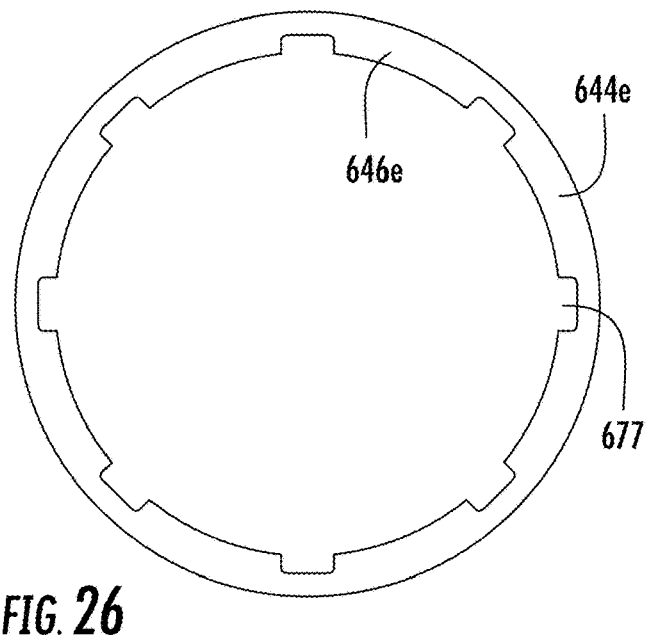
FIG. 26 is a top view of a fitting according to various embodiments described herein.

FIG. 26 illustrates another configuration of a fitting 644*e* according to various embodiments. Fitting 644*e* has an annular shape including a plurality of inwardly extending projections 646*e*. The illustrated projections 646*e* occupy a larger portion of the circumference of the fitting 644*e* than projections 646*c* shown in FIG. 24B to provide greater contact along the corresponding perimeter of the outer sidewall of a vessel. Gaps 667 extend between adjacent projections 644*e* to provide air passages for movement atmosphere during assembly and disassembly. In one embodiment, fitting 644*e* includes a flange similar to fitting 644*c* (FIGS. 23-24B). Fitting 644*e* may be configured with a projection and/or groove along an outer sidewall to assist in maintaining position of the fitting 644*e*. For example, a projection may be received within a corresponding groove of a fitting receptacle along an inner sidewall of a shell. Similarly, a groove may receive a corresponding projection of a fitting receptacle along an inner sidewall of a shell.

Figure 27:
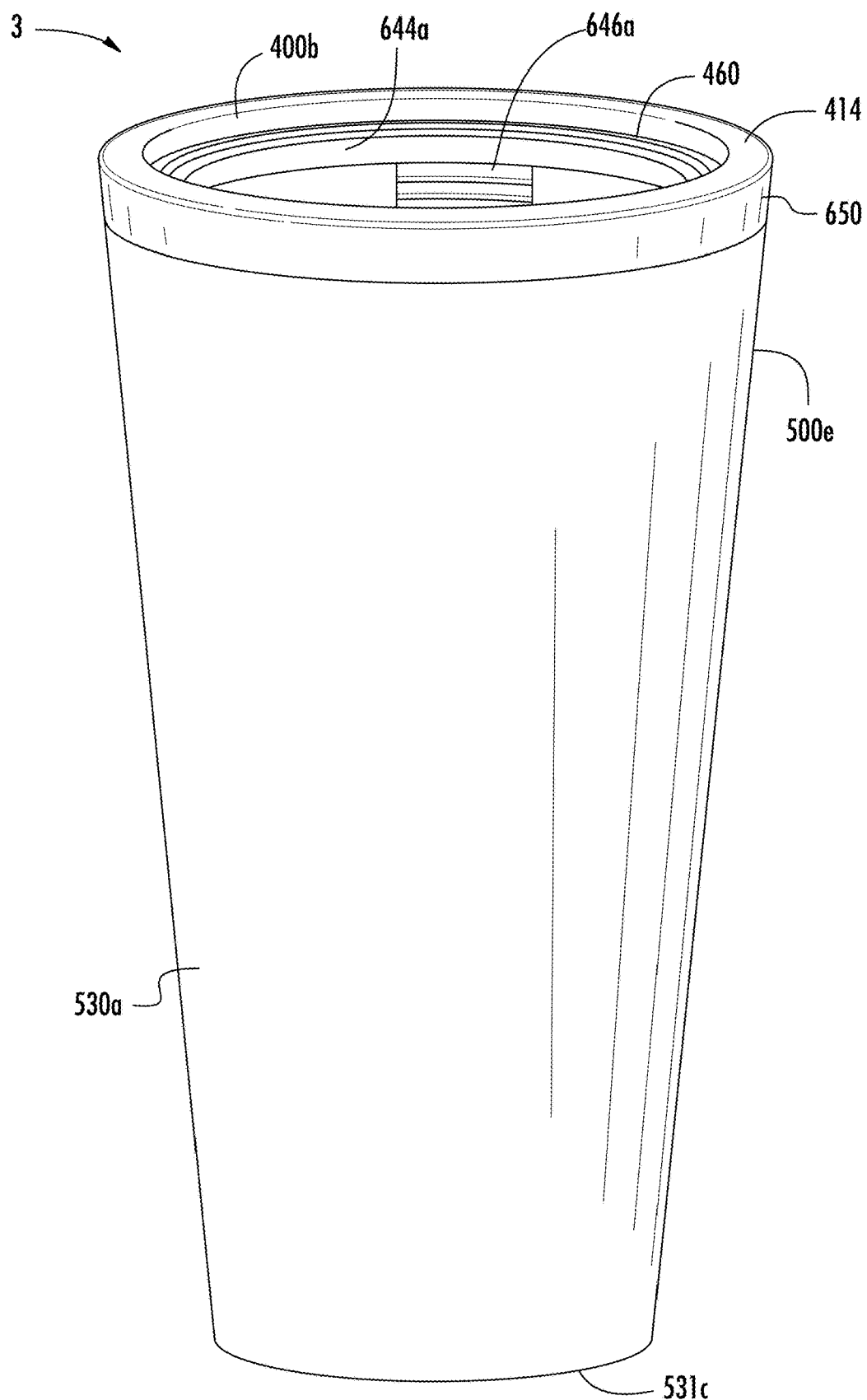
FIG. 27 is a perspective view of a modular beverage container system including shell having a multi-wall configuration according to various embodiments described herein.

The modular beverage container system 3 illustrated in FIG. 27 includes a vessel 400*b* received within an inner volume of a double-wall shell 500*e*. The vessel 400*b* and shell 500*e* may be similar to those described with respect to FIG. 23 or elsewhere herein wherein like numbers indicate like features. A fitting 644*g* is positioned along an upper sidewall portion of the inner sidewall of the shell 500*e* and situates between the shell 500*e* and vessel 400*b* when received therein. The fitting includes a plurality of wedge-shaped projections 646*g* positioned to interface with the vessel 400*b* to provide a press fit, which may also be referred to as an interference or friction fit. The projections 646*g* included sets of projections aligned vertically and that are circumferentially spaced apart along the perimeter of the interior volume 510 from other sets of projections. The shell 500*e* may include a fitting receptacle including one or more grooves or projections (not shown) that interface with corresponding projections or grooves along a sidewall of the fitting 644*g*, e.g., as described above with respect to FIG. 23. The fitting 644*g* may include a sidewall that may be glued or otherwise adhered to the interior of the shell 500*e*. In one embodiment, the fitting 644*g* includes a sidewall that does not include grooves or projections and is glued to the interior of the shell 500*e*. In another embodiment, the sidewall comprises a rigid material including one or more grooves or projections that interface with one or more projections or grooves along the interior of the shell 500*e*. In another embodiment, a rigid sidewall configuration with or without grooves or projections may be glued to the interior of the shell 500*e*.

Figure 28:
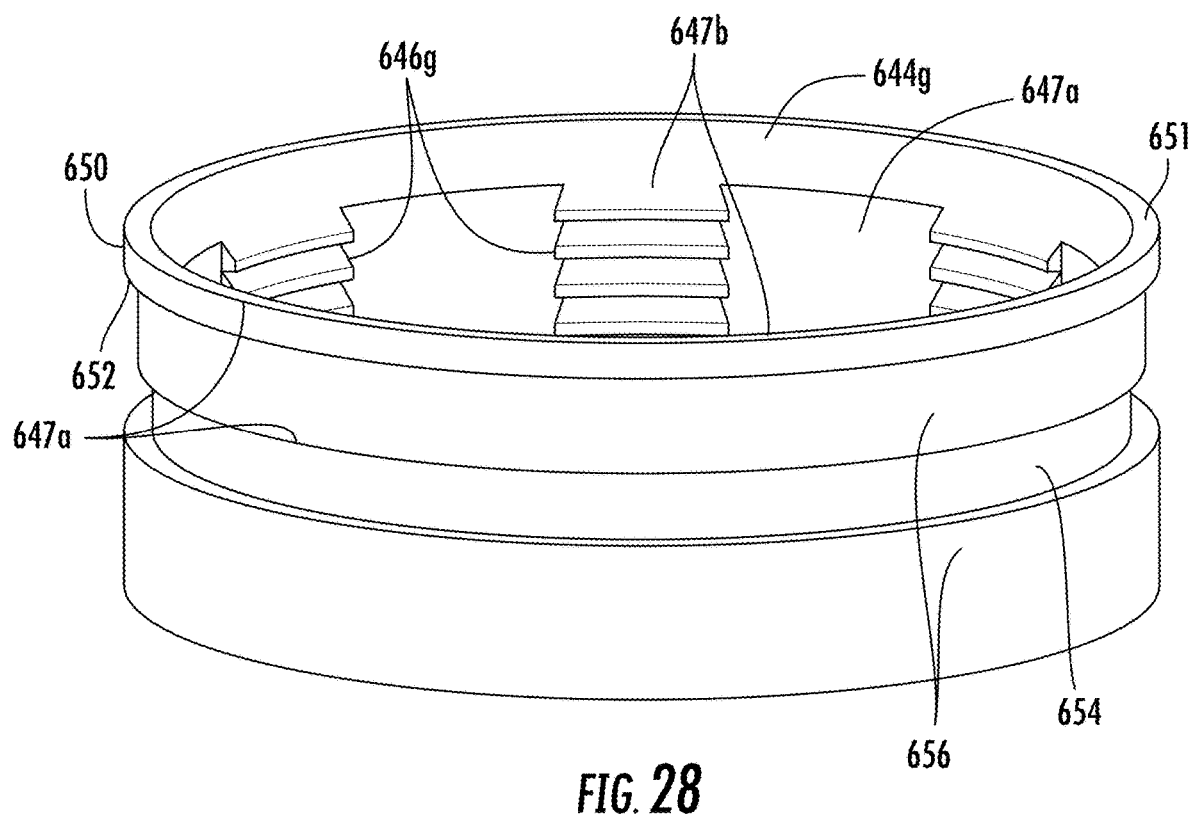
FIG. 28 is a perspective view of a fitting according to various embodiments described herein.

With further reference to FIG. 28 illustrating an embodiment of the fitting 644*g* of FIG. 27, fitting 644*g* may comprise a flange 651 having an upper surface 651 and a lower surface 652. The upper surface 651 is configured to interface with the lip 434 of the vessel rim 414 and the lower surface 652 is configured to position along the upper rim 514 of the shell 500*e*. The sidewall 656 includes one or more grooves 654 for receiving one or more projections along the interior wall of the shell 500*e*, e.g., along a fitting receptacle. The fitting 644*g* has a rigid body comprising a rigid material 647*a* along the flange 650 and sidewall 656. An elastomeric material 647*b*, such as silicone, extends along the upper surface 651 of the flange 650, around an upper inner perimeter of the fitting 644*g*, and includes the projections 646*g*. In some embodiments, the system 3 illustrated in FIG. 27 may include a lower fitting or additional fittings, such as those described herein.

While the illustrated embodiments depict one or more fittings including projections that contact the outer sidewall of a vessel along upper and/or lower portions of the inner sidewall, projections may be positioned to engage any portion of the outer sidewall of the vessel. In one embodiment, projections extend along a larger length of the inner sidewall of the inner wall of the shell, such as 50% or greater. It is to be appreciated that fittings may be additionally or alternatively attached to a vessel. For example, fittings including one or more outwardly extending projections may be attached to a vessel for engaging an inner sidewall within an interior volume of a vessel. Additionally, fittings may attach to an inner sidewall of a shell and/or outer sidewall of a vessel utilizing other projection and groove configurations or without projections and/or grooves. In one example, a vessel includes a compressible material along an outer surface of the sidewall that provides an increased dimension with respect to a corresponding dimension of the interior volume of the shell.

In various embodiments, a fitting may comprise a dimension along the perimeter of the inner wall of the shell that is reduced with respect to the corresponding dimension along the sidewall of the vessel. The dimension may be compressible. For example, the fitting may comprise a compressible or elastomeric coating, overmold, or material attached along the inner wall of the shell. In some embodiments, gaps may be provided between portions of the fitting configured to engage the sidewall of the vessel. For example, one or more vertically extending gaps may be provided. In some embodiments, the outer sidewall of the vessel may include grooves or surface features that limit engagement with a corresponding fitting surface along one or more portions of the sidewall such as a perimeter thereof.

Further embodiments may be configured to removably couple the lid over the interior volume and/or create a seal therebetween in additional or alternative ways. In one example configuration, the lid may include a perimeter groove dimensioned to receive the upper rim or an extension thereof of the vessel or shell. In one example, the perimeter groove is defined by the lid such that the opening of the groove is positioned downward to receive an upward extending projection. In some examples, the perimeter groove may be defined along an interior perimeter of the lid, e.g., along an interior portion of the lower rim, such that the opening of the groove is positioned interiorly. In one example, the projection may include a lip that projects outward of an outer most sidewall of the vessel and/or shell when the vessel and shell are coupled such that the projection may be received within the groove when the lid is pressed over the projection. The projection or a lower portion of the lid defining the groove may include resilient elastomeric material to allow the projection to couple and decouple from the groove. In another example, the lid may define an interior dimension corresponding to or slightly less than an outer dimension along the upper end of the modular beverage container system. For example, the lid may define an interior dimension along its lower rim configured to press fit with a slightly larger outer dimension defined by the upper rim of one or both of the vessel or shell. Some examples may include one of the above press fit configurations in addition to or instead of a press fit between the lid and an interior perimeter of the vessel. In various embodiments wherein the lid press fits with the shell, the fitment may removably couple the vessel and shell, which may be in addition to or instead of other manners of removably coupling the vessel and shell described herein.

In various configurations, the lid may include a fitting comprising threads configured to removably couple the lid over the interior volume. For example, the lid may include threads positioned along an outer perimeter configured to threadably engage corresponding threads positioned along an inner sidewall of the vessel or shell. In a further or another example, the lid may include threads positioned along an interior perimeter configured to threadably engage corresponding threads positioned along an outer sidewall of the vessel or shell. In some embodiments, threadably coupling the lid and the shell may also removably couple the vessel and the shell, which may be in addition to or instead of couplings described elsewhere herein. For example, threadably coupling the lid to the outer sidewall may retain and/or compress the vessel against the inner sidewall or base of the shell.

In one embodiment, the modular beverage container system includes a cap that may be positioned over the interior volume of the vessel. The cap may be configured to press fit, thread, or otherwise sealingly engage around the outer perimeter of the vessel or shell. In various embodiments, the cap may be used absent a lid or may be positioned over a lid received by the vessel. In one example, an underside of the cap is configured to cover or insert through openings in a lid to prevent liquid from flowing through the openings when the cap is secured.

As described herein, the shell and vessel may be modular. Thus, a user may remove the vessel for cleaning, heating, or replacement, for example. In some examples, the modular beverage container system may include a plurality of shells and/or vessels wherein the shells and/or vessels are interchangeable. For example, a user may remove the vessel from the shell and replace it with another vessel, e.g., if the vessel has broken. Similarly, a user may remove the vessel from the shell and insert the vessel in another shell. Similarly, in various embodiments, the modular beverage container system includes a modular lid, which may be removed for cleaning or replacement. In one example, a modular beverage container system includes a vessel configured to be received within a plurality of shells. The shells may include different configurations having various contoured exterior forms but defining similar interior volumes to receive the vessel. The modular beverage container system may also include a plurality of interchangeable lids configured to be received within the vessel. Similar to the plurality of shells, the lids may include different contoured exterior forms along the partition plate such as different opening or cap configurations. In some embodiments, the modular beverage container system may include a plurality of interchangeable vessels. The vessels may be configured to provide alternate fitting arrangements with shells or lids. Accordingly, users may select a desired configuration of shell, vessel, or lid. Whether the interchangeable components of the system are configured similarly or different, the modular configuration may allow users to wash components separately or replace damaged or worn components. Similarly, the modular components may be washed separately, e.g., the vessel may be ran through a dishwasher appliance.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth in this specification. Such embodiments may be obtained, for example, by combining, modifying, or reorganizing any of the disclosed steps, components, elements, features, aspects, characteristics, limitations, and the like, of the various non-limiting and non-exhaustive embodiments described in this specification.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an application of the described embodiments. Further, the use of a singular noun includes the plural, and the use of a plural noun includes the singular, unless the context of the usage requires otherwise. Additionally, the grammatical conjunctions "and" and "or" are used herein according to accepted usage. By way of example, "x and y" refers to "x" and "y". On the other hand, "x or y" generally refers to "x", "y", or both "x" and "y", and may be considered to be generally synonymous with "and/or," whereas "either x or y" refers to exclusivity.

The present disclosure may be embodied in other forms without departing from the spirit or essential attributes thereof and, accordingly, reference should be had to the following claims rather than the foregoing specification as indicating the scope of the invention. Further, the illustrations of arrangements described herein are intended to provide a general understanding of the various embodiments, and they are not intended to serve as a complete description. Many other arrangements will be apparent to those of skill in the art upon reviewing the above description. Other arrangements may be utilized and derived therefrom, such that logical substitutions and changes may be made without departing from the scope of this disclosure.

What is claimed is:

1. A modular beverage container system, the system comprising:
    a vessel comprising a sidewall having an upper rim and defining an interior volume for holding a beverage; and
    a shell comprising an inner wall, an outer wall, an upper rim, and a sealed volume between the inner wall and the outer wall, the sealed volume at a vacuum pressure, and the inner wall and upper rim defining an interior volume configured to receive the vessel and removably couple thereto.

2. The system of claim 1, further comprising a fitting positioned within the interior volume of the shell, wherein the fitting provides a reduced dimension along a perimeter of the interior volume of the shell with respect to a corresponding dimension of the vessel to provide a press fit that removably couples the vessel within the interior volume of the shell.

3. The system of claim 2, wherein the fitting comprises one or more inwardly directed projections that engage an outer surface of the sidewall of the vessel when received within the interior volume of the shell.

4. The system of claim 3, wherein the one or more inwardly directed projections comprise one or more sets of wedge-shaped projections.

5. The system of claim 3, wherein at least one gap extends vertically between the one or more inwardly directed projections.

6. The system of claim 3, wherein the fitting comprises a flange that positions between the upper rim of the shell and a lip of the vessel when the vessel is removably coupled to the shell within the interior volume of the shell.

7. The system of claim 2, further comprising a fitting receptacle positioned along the inner wall of the shell for securely attaching the fittings within the interior volume of the shell.

8. The system of claim 7, wherein the fitting receptacle comprises one or more grooves that interface with one or more corresponding projections that extend outwardly of an outer perimeter of the fitting.

9. The system of claim 7, wherein the fitting receptacle comprises one or more inwardly directed projections that interface with one or more corresponding grooves positioned along an outer perimeter of the at least one fitting.

10. The system of claim 1, wherein, when the vessel and shell are removably coupled, an outer surface of the sidewall of the vessel positions approximately flush with an outer surface of the outer wall of the shell.

11. The system of claim 1, wherein the upper rim of the vessel includes a lip, and wherein, when the vessel and shell are removably coupled, the lip of the vessel positions over an upper surface of the upper rim of the shell.

12. The system of claim 1, wherein the upper rim of the vessel includes an outer sidewall extending around the upper rim between an upper surface of the upper rim and the lip of the vessel, and wherein, when the vessel and shell are removably coupled, the outer sidewall of the vessel positions approximately flush with an outer surface of the outer wall of the shell.

13. The system of claim 1, wherein the vessel comprises a glass and the shell comprises stainless steel.

14. The system of claim 1, further comprising a lid configured to removably couple over the interior volume of the vessel.

15. The system of claim 14, wherein the lid includes a fitting configured to press fit against an inner surface of the sidewall of the vessel to removably couple over the interior volume of the vessel.

16. The system of claim 15, wherein, when the lid is removably coupled over the interior volume of the vessel, an upper surface of the upper rim of the lid positions approximately flush with or below an upper surface of the upper rim of the vessel.

17. A method of assembling a modular beverage container, the method comprising:
    inserting a vessel within an interior volume of a shell, wherein a fitting is positioned within the interior volume of the shell and defines a dimension therein that is less than a corresponding dimension of the vessel; and
    removably coupling the vessel within the interior volume of the shell by press fitting the vessel within the interior volume of the shell such that the fitting engages the corresponding dimension of the vessel, wherein the shell comprises an outer wall and inner wall, the inner wall defining the interior volume, and wherein a sealed volume at a vacuum pressure is provided between the outer wall and inner wall of the vessel.

18. The method of claim 17, wherein the vessel has an upper rim including an outer sidewall, and wherein, when the vessel and shell are removably coupled, the outer sidewall is positioned above an upper rim of the shell and extends outwardly of a portion of the interior volume of the shell defined by the upper rim of the shell.

19. The method of claim 18, wherein the upper rim of the vessel includes a lip, and wherein, when the vessel and shell are removably coupled, the lip positions over an upper surface of the upper rim of the shell and the outer sidewall positions approximately flush with an outer surface of the outer wall of the shell.

20. A modular beverage container system, the system comprising:
    a glass vessel comprising a sidewall having an upper rim and defining an interior volume for holding a beverage; and
    a metal shell comprising an inner wall, an outer wall, an upper rim, and a sealed volume between the inner wall and the outer wall, the sealed volume at a vacuum pressure, and the inner wall and upper rim defining an interior volume configured to receive the vessel and removably couple thereto;
    a fitting positioned within the interior volume of the shell, wherein the fitting provides a reduced dimension along a perimeter of the interior volume of the shell with respect to a corresponding dimension of the vessel to provide a press fit that removably couples the vessel within the interior volume of the shell;
    a fitting receptacle positioned along the inner wall of the shell for securely attaching the fittings within the interior volume of the shell, the fitting receptacle comprising one or more grooves and/or projections that interface with corresponding projections and/or grooves of the fitting; and
    a lid configured to press fit against an inner surface of the sidewall of the vessel to removably couple over the interior volume of the vessel.

* * * * *